(12) United States Patent
Watanabe et al.

(10) Patent No.: US 11,465,239 B2
(45) Date of Patent: Oct. 11, 2022

(54) MANUFACTURING METHOD FOR JOINT BODY AND MANUFACTURING APPARATUS FOR JOINT BODY

(71) Applicant: KOBE STEEL, LTD., Hyogo (JP)

(72) Inventors: Kenichi Watanabe, Kobe (JP); Takayuki Kimura, Kobe (JP); Liang Chen, Fujisawa (JP); Masao Hadano, Fujisawa (JP); Reiichi Suzuki, Fujisawa (JP)

(73) Assignee: Kobe Steel, Ltd., Hyogo (JP)

( * ) Notice: Subject to any disclaimer, the term of this patent is extended or adjusted under 35 U.S.C. 154(b) by 177 days.

(21) Appl. No.: 16/636,172

(22) PCT Filed: Aug. 3, 2018

(86) PCT No.: PCT/JP2018/029206
§ 371 (c)(1),
(2) Date: Feb. 3, 2020

(87) PCT Pub. No.: WO2019/044380
PCT Pub. Date: Mar. 7, 2019

(65) Prior Publication Data
US 2020/0376598 A1   Dec. 3, 2020

(30) Foreign Application Priority Data

Aug. 31, 2017  (JP) .............................. JP2017-167224

(51) Int. Cl.
*B23K 26/21*  (2014.01)
*B23K 26/08*  (2014.01)
(Continued)

(52) U.S. Cl.
CPC ............ *B23K 26/21* (2015.10); *B23K 26/083* (2013.01); *B23K 26/0869* (2013.01);
(Continued)

(58) Field of Classification Search
CPC .......... B23K 2101/006; B23K 2101/16; B23K 2101/18; B23K 2103/04; B23K 26/082;
(Continued)

(56) References Cited

U.S. PATENT DOCUMENTS

2003/0087117 A1   5/2003  Duley et al.
2009/0314750 A1  12/2009  Saitoh et al.
(Continued)

FOREIGN PATENT DOCUMENTS

| CN | 1403238 | * | 3/2003 |
|---|---|---|---|
| JP | H10-71480 A | | 3/1998 |
| JP | H1071480 | * | 12/2001 |
| JP | 2002-160020 A | | 6/2002 |
| JP | 2002160020 | * | 6/2002 |

OTHER PUBLICATIONS

The extended European search report issued by the European Patent Office dated May 10, 2021, which corresponds to European Patent Application No. 18850541.6-1016 and is related to U.S. Appl. No. 16/636,172.
(Continued)

*Primary Examiner* — Dana Ross
*Assistant Examiner* — Joseph W Iskra
(74) *Attorney, Agent, or Firm* — Studebaker & Brackett PC

(57) ABSTRACT

A manufacturing method for a joint body having a first metal member and a second metal member joined together by causing a laser oscillation system to irradiate a surface of the second metal member placed on the first metal member with laser light to form a joint portion including a welded portion where the first metal member and the second metal member are joined together includes continuously supplying the second metal member while pressing the second metal member against the first metal member, the second metal member being a hoop material, and causing the laser oscillation system to emit the laser light.

6 Claims, 20 Drawing Sheets

(51) Int. Cl.
  *B23K 37/04* (2006.01)
  *B23K 103/04* (2006.01)
  *B23K 101/00* (2006.01)
(52) U.S. Cl.
  CPC ...... *B23K 26/0876* (2013.01); *B23K 37/0408* (2013.01); *B23K 2101/006* (2018.08); *B23K 2103/04* (2018.08)
(58) Field of Classification Search
  CPC .............. B23K 26/083; B23K 26/0846; B23K 26/0869; B23K 26/0876; B23K 26/0884; B23K 26/21; B23K 26/244; B23K 26/26; B23K 37/0408; B62D 25/04
  USPC .................................................... 219/121.64
  See application file for complete search history.

(56) References Cited

U.S. PATENT DOCUMENTS

2016/0083016 A1    3/2016   Imada et al.
2016/0354867 A1   12/2016   Matsuoka et al.

OTHER PUBLICATIONS

International Preliminary Report on Patentability and Written Opinion issued in PCT/JP2018/029206; dated Mar. 12, 2020.

* cited by examiner

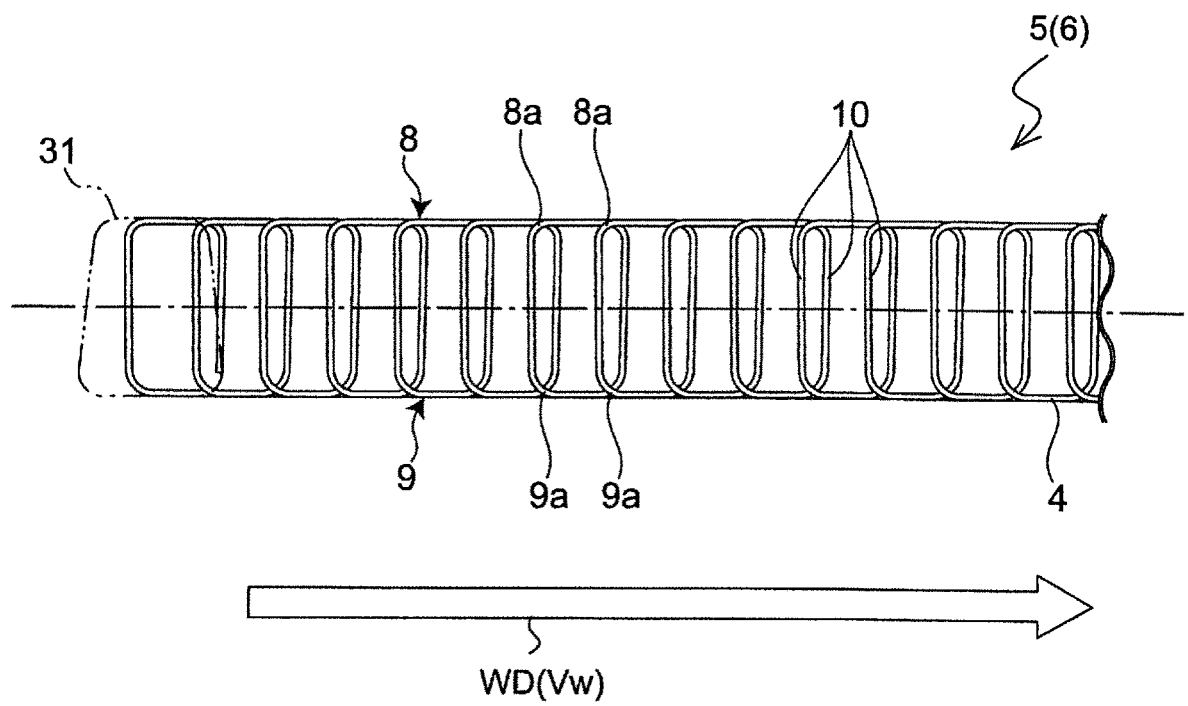
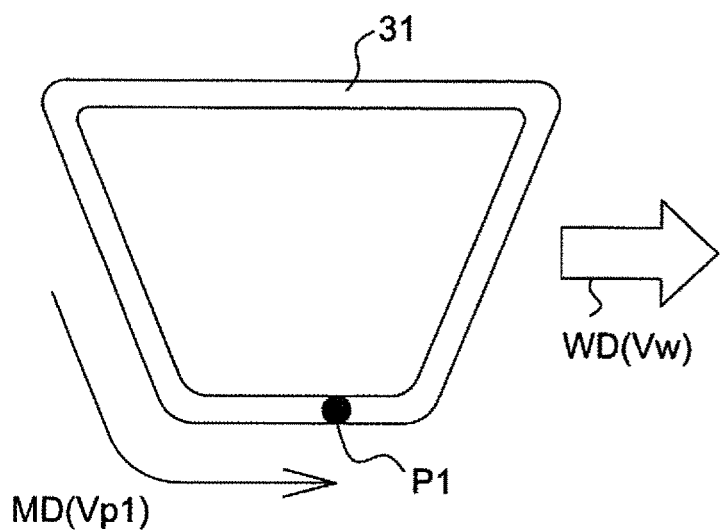

MANUFACTURING METHOD FOR JOINT BODY AND MANUFACTURING APPARATUS FOR JOINT BODY

CROSS-REFERENCE TO RELATED APPLICATIONS

This is a national phase application in the United States of International Patent application No. PCT/JP2018/029206 with an international filing date of Aug. 3, 2018, which claims priority of Japanese Patent Application No. 2017-167224 filed on Aug. 31, 2017. The contents of the application are incorporated herein by reference.

TECHNICAL FIELD

The present invention relates to a manufacturing method for a joint body and a manufacturing apparatus for a joint body.

BACKGROUND ART

Conventionally known is a technique for manufacturing an automobile frame member by press-molding a metal plate. For application of such an automobile frame member, there is a growing demand not only for metal plates with a constant thickness, but also for metal plates each reinforced by partially including a thickness-increased portion where the metal plate is increased in thickness.

JP 2001-507993 A and JP 2016-064725 A disclose a technique for manufacturing such a member partially including a thickness-increased portion by joining two metal members, that is, a first metal member and a second metal member, by laser welding.

SUMMARY OF THE INVENTION

Problems to be Solved by the Invention

Herein, as disclosed in JP 2001-507993 A and JP 2016-064725 A, when the second metal member is welded to the first metal member by laser, it is necessary to clamp the second metal member to the first metal member. With the second metal member clamped to the first metal member, a portion of the second metal member that is clamped to the first metal member cannot be welded by laser, and thus the second metal member cannot be welded by laser in its entirety. This in turn makes it difficult to increase joint strength between the first metal member and the second metal member.

It is therefore an object of the present invention to provide a manufacturing method and manufacturing apparatus for a joint body having two metal members joined together by welding, an increase in joint strength between the two metal members being achieved by the manufacturing method and the manufacturing apparatus.

Means for Solving the Problems

Provided according to a first aspect of the present invention is a manufacturing method for a joint body having a first metal member and a second metal member joined together by causing a laser oscillation system to irradiate a surface of the second metal member placed on the first metal member with laser light to form a joint portion including a welded portion where the first metal member and the second metal member are joined together, the manufacturing method including continuously supplying the second metal member while pressing the second metal member against the first metal member, the second metal member being a hoop material, and causing the laser oscillation system to emit the laser light.

The above configuration where the second metal member is continuously supplied while being pressed against the first metal member eliminates the need for clamping the second metal member to the first metal member and thus allows the entirety of the second metal member to be welded by laser. This in turn makes it possible to increase joint strength between the first metal member and the second metal member.

Provided according to a second aspect of the present invention is a manufacturing apparatus for implementing the manufacturing method for a joint body according to the first aspect. Specifically, provided according to the second aspect of the present invention is a manufacturing apparatus for a joint body having a first metal member and a second metal member joined together by causing a laser oscillation system to irradiate a surface of the second metal member placed on the first metal member with laser light to form a joint portion including a welded portion where the first metal member and the second metal member are joined together, the manufacturing apparatus including a supplying unit configured to continuously supply the second metal member while pressing the second metal member against the first metal member, the second metal member being a hoop material.

Effect of the Invention

With the manufacturing method and the manufacturing apparatus according to the present invention, it is possible to manufacture a joint body having an increased joint strength between the first metal member and the second metal member constituting the joint body.

BRIEF DESCRIPTION OF THE DRAWINGS

FIG. 12B is a schematic plan view showing an example of a joint portion obtained based on the irradiation pattern shown in FIG. 12A.

FIG. 13A is a schematic plan view showing a sixth alternative of the irradiation pattern of laser light.

MODE FOR CARRYING OUT THE INVENTION

First Embodiment

A description will be given below of a first embodiment of the present invention with reference to FIG. 1 to FIG. 16B.

(Joint body)

Figure 1:
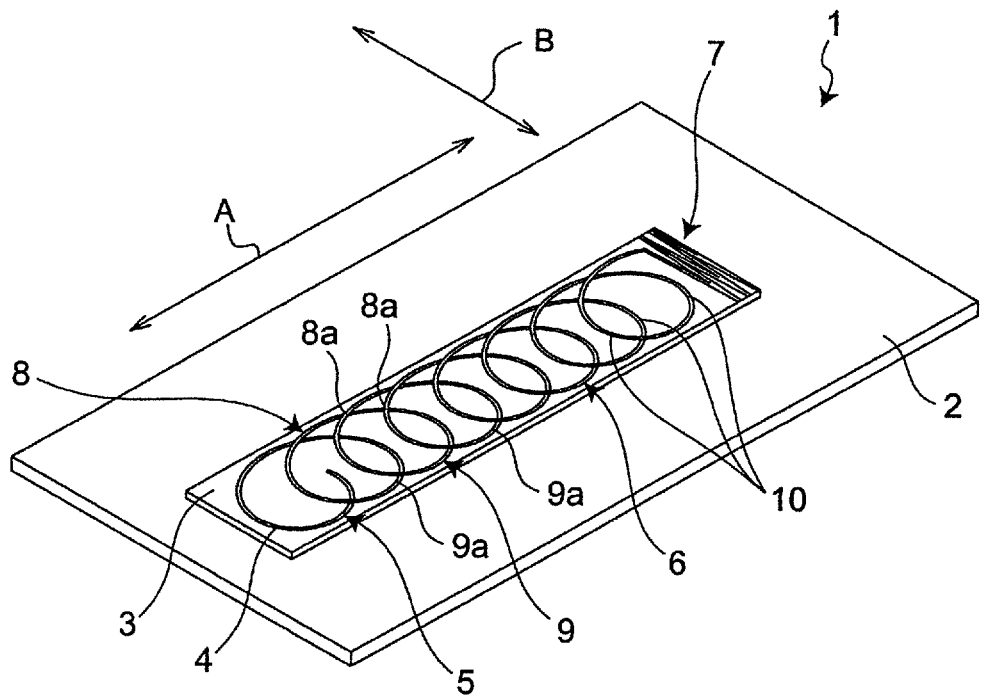
FIG. 1 is a perspective view of an example of a joint body manufactured by a manufacturing apparatus according to a first embodiment of the present invention.
Figure 2:
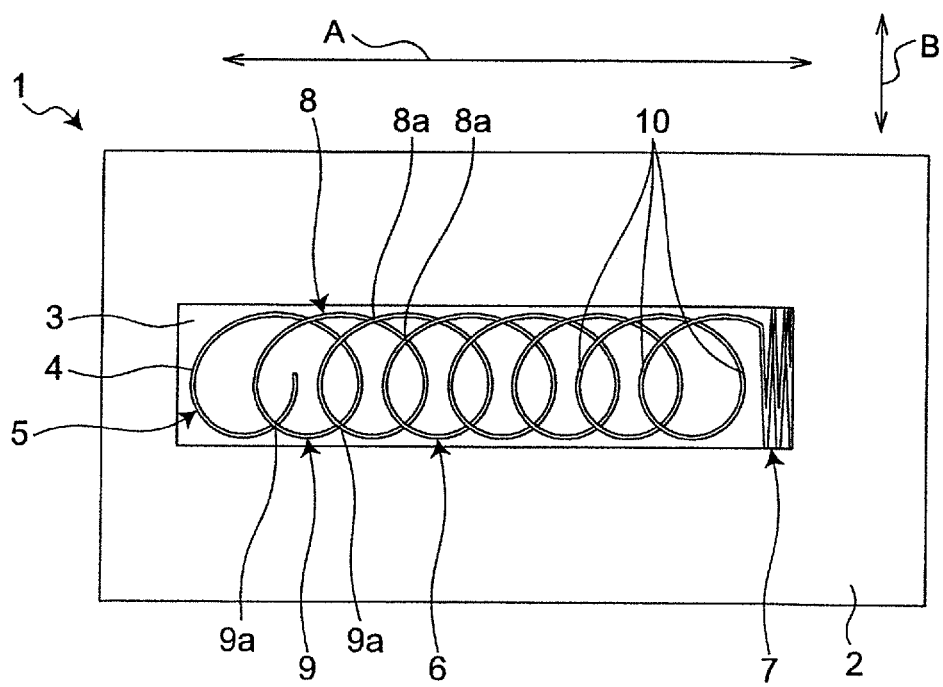
FIG. 2 is a plan view of the example of the joint body manufactured by the manufacturing apparatus according to the first embodiment of the present invention.

FIG. 1 and FIG. 2 show a joint body 1 manufactured by a manufacturing apparatus (FIG. 4 and FIG. 5) according to the first embodiment of the present invention.

The joint body 1 shown in FIG. 1 and FIG. 2 includes a blank material 2 (first metal member) that is an example of a steel plate and a reinforcing material 3 (second metal member) that is also an example of a steel plate. According to the present embodiment, the reinforcing material 3 is narrower than the blank material 2.

The reinforcing material 3 is placed on the blank material 2 and fixed to the blank material 2 by laser welding. The joint body 1 includes a joint portion 5 formed by one streak of continuous welding mark or welded portion 4, along which the blank material 2 and the reinforcing material 3 are joined together. The joint portion 5 shown in FIG. 1 and FIG. 2 is merely an example, and, as will be described later with reference to FIG. 8A to FIG. 16B, the specific form of the joint portion 5 includes various alternatives.

The joint portion 5 includes a main body 6 and an end portion 7.

According to the present embodiment, the welded portion 4 in the main body 6 of the joint portion 5 has a curved shape having a periodic repetitive pattern and includes a first longitudinal portion 8, a second longitudinal portion 9, and a plurality of connecting portions 10 having a curved shape. In the first longitudinal portion 8, a plurality of intersecting portions 8a (first intersecting portions) where the welded portion 4 intersects itself are arranged in one direction A (first direction) in plan view, and the first longitudinal portion 8 itself extends in the direction A. The direction A coincides with a welding direction (see a symbol WD in FIG. 4, for example) to be described later and a direction opposite to the welding direction. The second longitudinal portion 9 is located apart from the first longitudinal portion 8 in a direction B orthogonal to the direction A in plan view. In the second longitudinal portion 9, as with the first longitudinal portion 8, a plurality of intersecting portions 9a (second intersecting portions) where the welded portion 4 intersects itself are arranged in the direction A in plan view, and the second longitudinal portion 9 itself extends in the direction A. The plurality of connecting portions 10 are arranged at intervals in the direction A, each of the connecting portions 10 extends in the direction B, and both ends of each of the connecting portions 10 are connected to the first longitudinal portion 8 and the second longitudinal portion 9. According to the present embodiment, the first longitudinal portion 8, the second longitudinal portion 9, and the plurality of connecting portions 10 form a ladder structure in plan view.

The end portion 7 of the joint portion 5 has a zigzag shape or a zigzag-line shape that extends forward and backward, at close intervals, between both ends in a width direction of the reinforcing material 3. As will be described later with reference to FIG. 19, the joint portion 5 may include only the main body 6 without the end portion 7.

In the main body 6 of the joint portion 5, the welded portion 4 having a line shape continuously extends in two directions orthogonal to each other, that is, in both the directions A, B, in plan view. In other words, in the main body 6 of the joint portion 5, the welded portion 4 having a line shape is provided extending two-dimensionally, that is, in a planar form. Such a structure allows at least one streak of welded portion 4 to be present in plan view within a region having a certain area in the main body 6 of the joint portion 5. In particular, within small regions near the intersecting portions 8a of the first longitudinal portion 8 and the intersecting portions 9a of the second longitudinal portion 9, a plurality of streaks of welded portions 4 are present. The main body 6 of the joint portion 5 having such a structure makes it possible to sufficiently increase the joint strength between the blank material 2 and the reinforcing material 3. For example, when two members are joined together by spot welding, the welded portion includes a plurality of scattered spots. Further, the welded portion made even by laser welding may include one or a plurality of pairs of parallel straight lines, or may include a plurality of C-shaped portions arranged in a row and adjacent to each other. Compared to any of the above structures, the main body 6 of the joint portion 5 in which the welded portion having a line shape continuously extends in both the directions A, B shown in FIG. 1 and FIG. 2 makes it possible to join the blank material 2 and the reinforcing material 3 with higher joint strength.

Figure 3A:
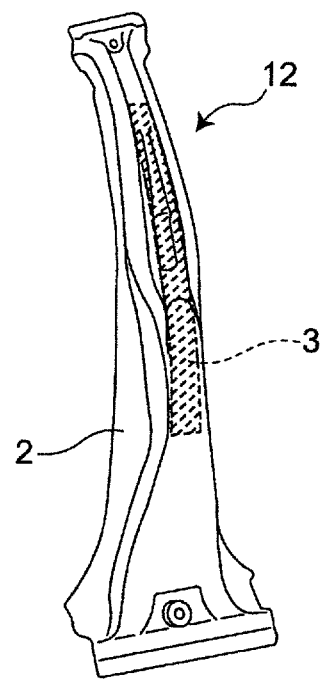
FIG. 3A is a perspective view of an example of a B pillar manufactured by processing the joint body by hot stamping.
Figure 3B:
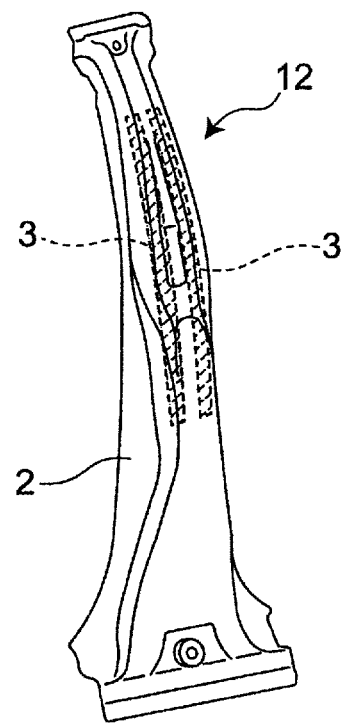
FIG. 3B is a perspective view of another example of the B pillar manufactured by processing the joint body by hot stamping.

Since the blank material 2 and the reinforcing material 3 are joined together with sufficient joint strength, the joint body 1 is suitable for processing by hot stamping, and it is thus possible to increase strength of a produced vehicle frame component against collision. For example, FIG. 3A shows an example of a B pillar 12 (an example of the vehicle frame component) manufactured by processing the joint body 1 by hot stamping. In this example, the B pillar 12 including the blank material 2 and one sheet of reinforcing material 3 joined to the blank material 2 is produced by a method in which the reinforcing material 3 is welded only to a portion of the blank material 2 that needs to be reinforced so as to have the joint portion 5 shown in FIG. 1 and FIG. 2 and then molded integrally with the blank material 2 by hot stamping. FIG. 3B shows another example of the B pillar 12 manufactured by processing the joint body 1 by hot stamping. In this example, two reinforcing members 3 are joined to the blank material 2, and each of the reinforcing materials 3 is joined to a ridge line portion formed by hot stamping.

In order to sufficiently increase the joint strength between the blank material 2 and the reinforcing material 3, it is preferable that, in the main body 6 of the joint portion 5, at least one streak of welded portion 4 passes through a square region whose side is 2 cm long, for example.

(Manufacturing Apparatus and Manufacturing Method for Joint Body)

Figure 4:
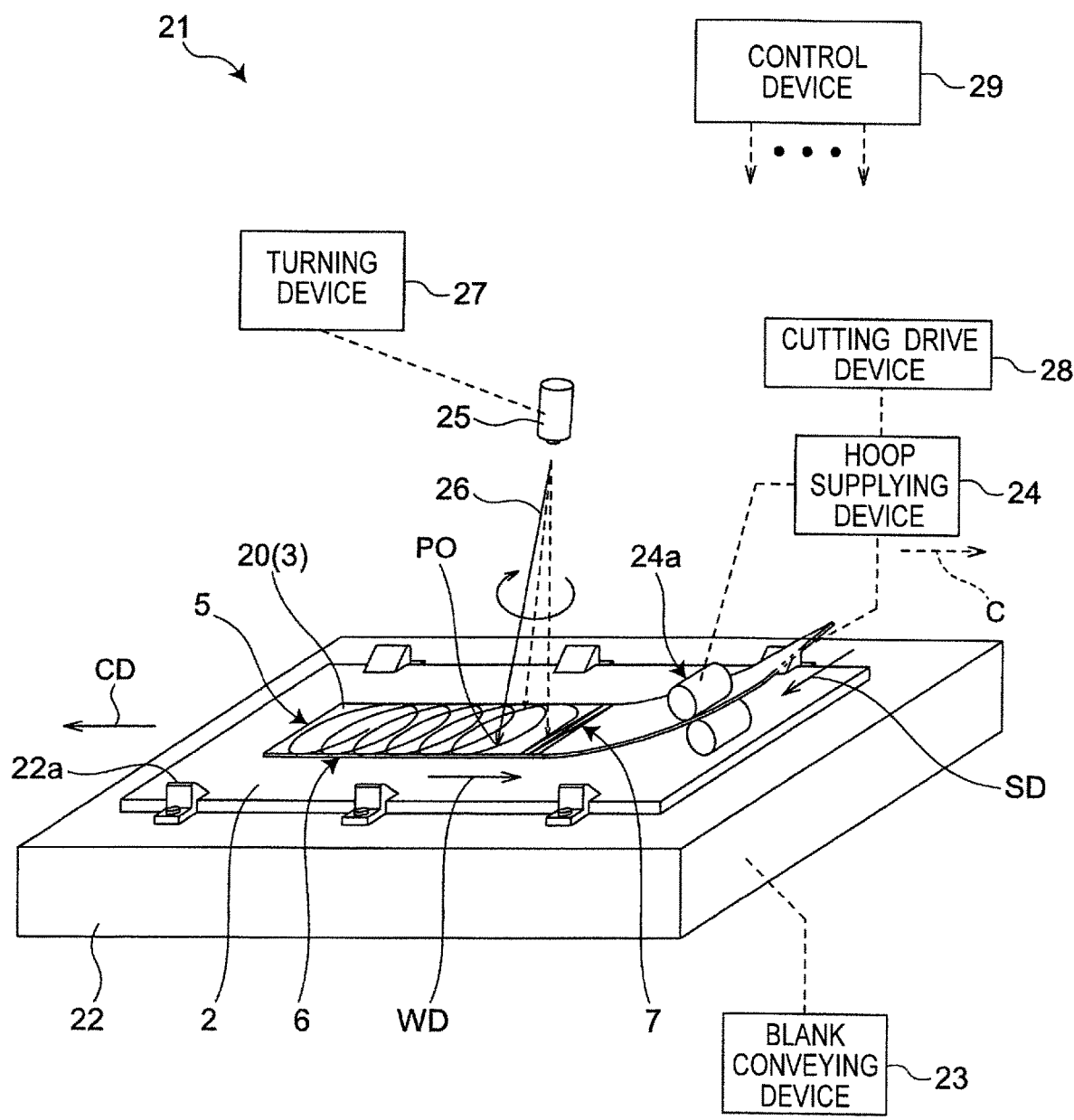
FIG. 4 is a schematic perspective view of the manufacturing apparatus for the joint body according to the first embodiment of the present invention.
Figure 5:
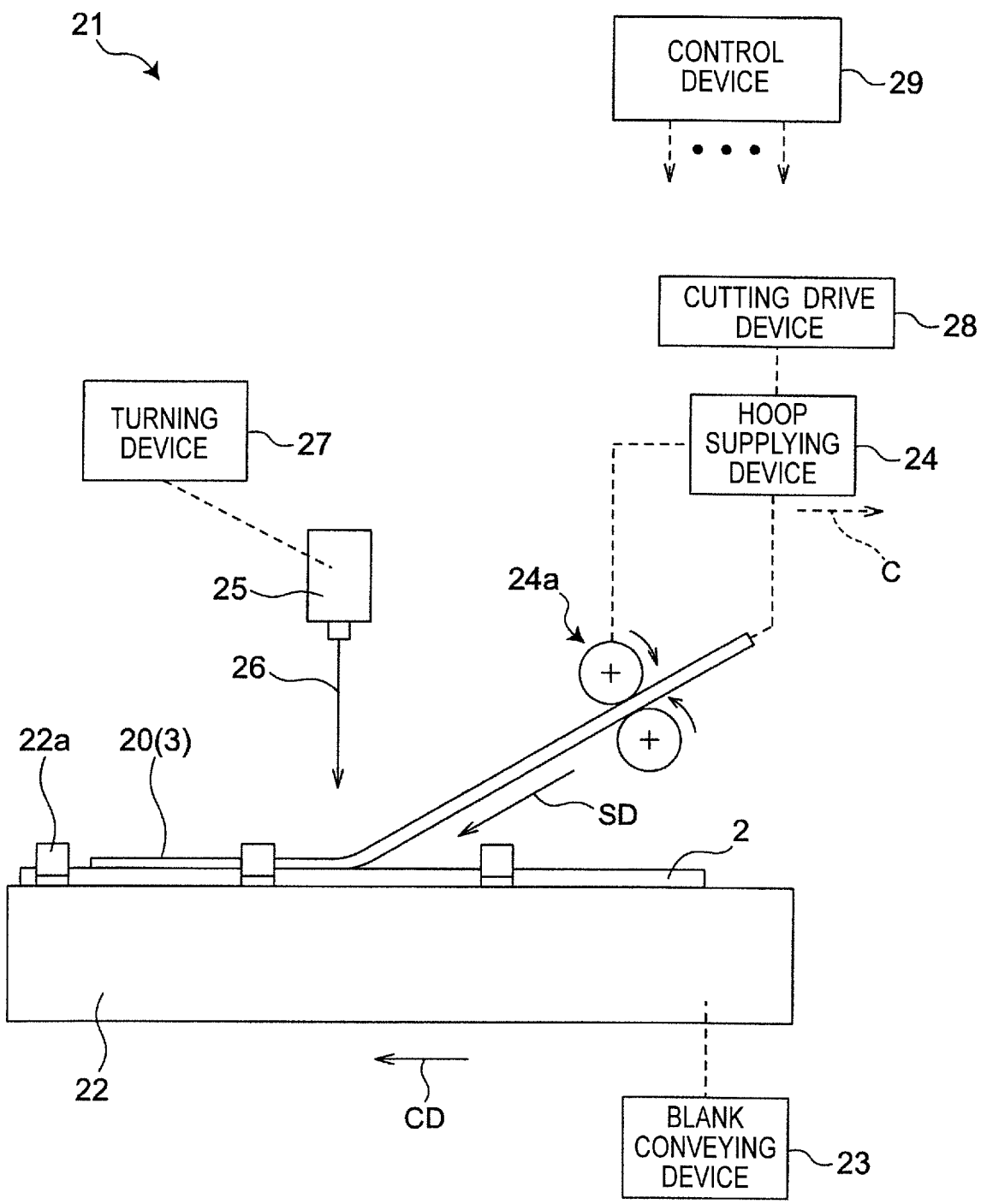
FIG. 5 is a schematic side view of the manufacturing apparatus for the joint body according to the first embodiment of the present invention.

FIG. 4 and FIG. 5 show a manufacturing apparatus 21 for the joint body 1 shown in FIG. 1 and FIG. 2. As will be described later with reference to FIG. 8A to FIG. 16B, the manufacturing apparatus 21 is also capable of manufacturing a joint body 1 that is different in structure of the joint portion 5 from the joint body 1 shown in FIG. 1 and FIG. 2.

The manufacturing apparatus 21 includes a table 22 on which the blank material 2 is detachably held by a fixture 22a. A blank conveying device 23 moves the table 22 and the blank material 2 held on the table 22 at a constant speed in a conveying direction CD opposite to the welding direction WD. The table 22 and the blank conveying device 23 serve as a conveying unit according to the present invention.

The manufacturing apparatus 21 includes a hoop supplying device 24. The hoop supplying device 24 (supplying unit) includes a supplying roll pair 24a. The hoop supplying device 24 unwinds a hoop material 20 wound in a coil shape (that becomes the reinforcing material 3 when the joint body 1 is completed) with the supplying roll pair 24a to supply the hoop material 20 onto the blank material 2 held on the table 22. More specifically, the hoop supplying device 24 continuously supplies the hoop material 20 thus unwound in a supplying direction SD that coincides with the conveying direction CD of the blank material 2 while pressing the hoop material 20 against the blank material 2 obliquely from above. A supplying speed of the blank material 2 supplied by the hoop supplying device 24 is synchronized with a conveying speed of the blank material 2 conveyed by the blank conveying device 23. Further, it is also possible to supply not only a continuous body wound in a hoop shape or a coil shape, but also a band material cut in advance to a length of the reinforcing material 3 (second metal member).

The manufacturing apparatus 21 includes a laser oscillation system 25. The laser oscillation system 25 includes components necessary for generating laser light, such as a laser oscillation element, a drive circuit, and an optical system. Laser light 26 emitted downward from the laser oscillation system 25 is projected onto an upper surface of the hoop material 20 at a position immediately before the hoop material 20 is pressed against the blank material 2 by the hoop supplying device 24. In FIG. 4, a symbol P0 denotes an irradiation position of the laser light 26. According to the present embodiment, the laser oscillation system 25 does not move in horizontal and vertical directions.

The manufacturing apparatus 21 includes a turning device 27 (irradiation direction changing unit). The turning device 27 periodically changes an irradiation direction of the laser light 26 emitted from the laser oscillation system. 25. As will be described in detail later, assuming that the laser oscillation system. 25 is not in motion in the welding direction WD relative to the blank material 2 and the hoop material 20, the turning device 27 periodically changes the irradiation direction of the laser light 26 to move a virtual irradiation position P1 along a closed figure (a circle as will be described later, according to the present embodiment). The blank conveying device 23, the hoop supplying device 24, and the turning device 27 serve as an irradiation position motion unit according to the present invention.

The manufacturing apparatus 21 includes a cutting drive device 28. As will be described in detail later, the cutting drive device 28 cuts the hoop material 20 by moving, after the hoop material 20 is welded to the blank material 2, the hoop supplying device 24 in the welding direction WD as indicated by an arrow C to apply tension to the hoop material 20. Note that, as described above, a configuration where the band material cut in advance to the length of the reinforcing material 3 (second metal member) is used eliminates the need for the cutting drive device 28.

A control device 29 controls, in a centralized manner, operations of various components of the manufacturing apparatus 21 including the blank conveying device 23, the hoop supplying device 24, the laser oscillation system 25, the turning device 27, and the cutting drive device 28.

A description will be given below of an operation of the manufacturing apparatus 21, that is, a manufacturing method for the joint body 1 performed by the manufacturing apparatus 21.

The irradiation direction of the laser light 26 emitted from the laser oscillation system 25 is periodically changed by the turning device 27. Further, the blank material 2 is moved in the conveying direction CD by the blank conveying device 23, and the hoop material 20 is continuously supplied from the hoop supplying device 24 in the supplying direction SD that coincides with the conveying direction CD. The movements of the blank material 2 and the hoop material 20 cause the laser oscillation system 25 to move relative to the blank material 2 and the hoop material 20 in the welding direction WD (opposite to the conveying direction CD and the supplying direction SD). The periodical change of the irradiation direction of the laser light 26 and the movement of the laser oscillation system 25 in the welding direction WD relative to the blank material 2 and the hoop material 20 change an irradiation position P0 of the laser light 26 on the upper surface of the hoop material 20. As a result, as described above, the main body 6 of the joint portion 5 including the first longitudinal portion 8, the second longitudinal portion 9, and the plurality of connecting portions 10 is obtained.

Figure 6A:
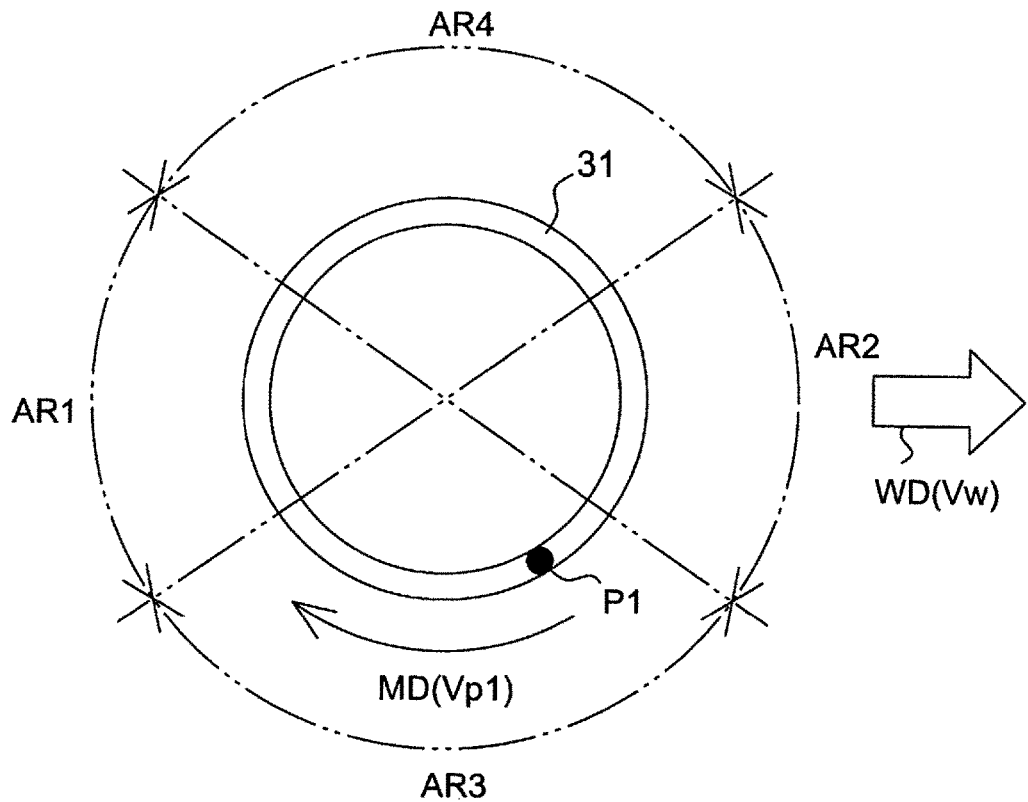
FIG. 6A is a schematic plan view showing an example of an irradiation pattern of laser light.

FIG. 6A shows an irradiation pattern 31 of the laser light 26 according to the present embodiment. The irradiation pattern 31 is a closed figure along which the virtual irradiation position P1 of the laser light 26 moves assuming that the laser oscillation system 25 is not in motion in the welding direction WD relative to the blank material 2 and the hoop material 20. The irradiation pattern 31 according to the present embodiment has a circular shape. The irradiation pattern 31 is obtained by causing the turning device 27 to periodically change the irradiation direction of the laser light 26 emitted from the laser oscillation system, 25. In FIG. 6A, a symbol MD denotes a direction in which the virtual irradiation position P1 moves on the irradiation pattern 31 according to the present embodiment.

Figure 6B:
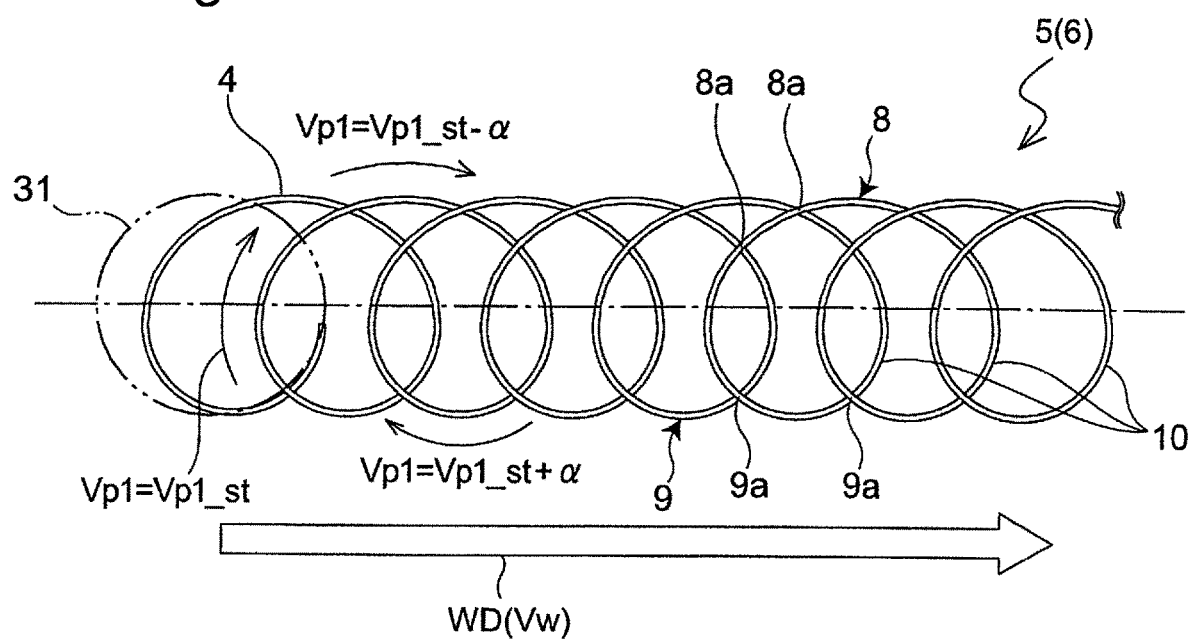
FIG. 6B is a schematic plan view showing an example of a joint portion obtained based on the irradiation pattern shown in FIG. 6A.
Figure 7:
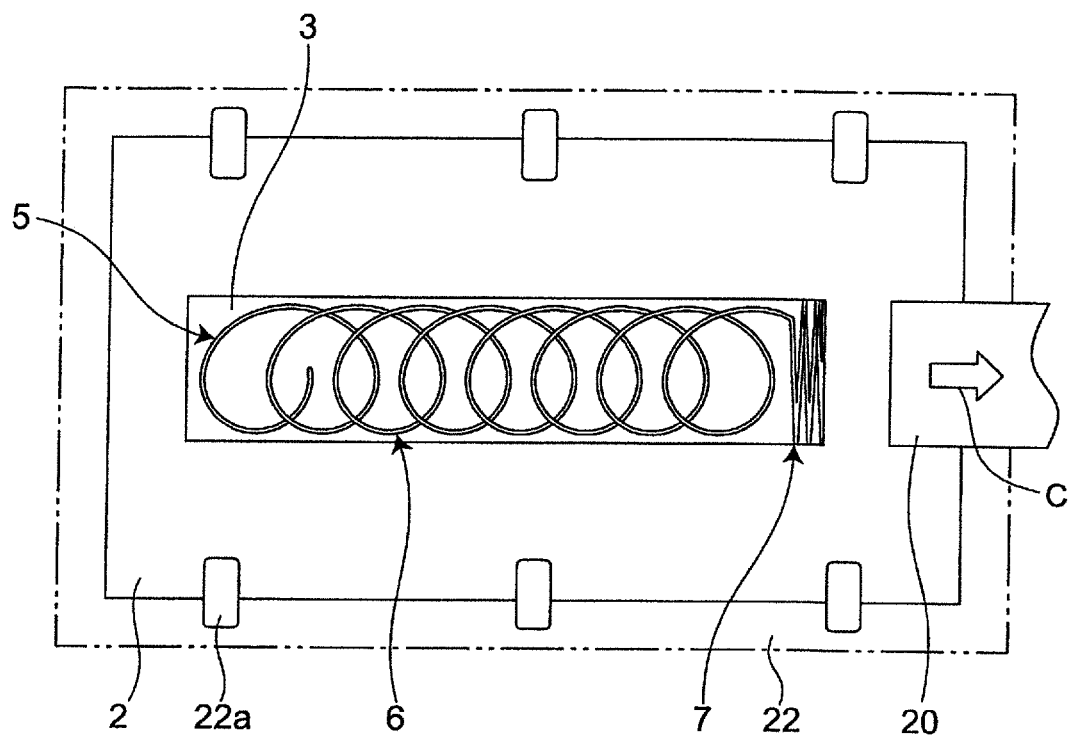
FIG. 7 is a schematic plan view for describing a cutting process.

FIG. 6B shows the main body 6 of the joint portion 5 obtained based on the irradiation pattern 31 having a circular shape shown in FIG. 6A. In general, the shape of the main body 6 of the joint portion 5 is determined based on a geometric shape of the irradiation pattern 31, a speed Vw at which the laser oscillation system 25 moves in the welding direction WD relative to the blank material 2 and the hoop material 20, and a speed Vp1 at which the virtual irradiation position P1 moves on the irradiation pattern 31 to be described later.

According to the present embodiment, the speed Vp1 at which the virtual irradiation position P1 moves on the irradiation pattern 31 is not constant. Specifically, for regions AR1, AR2 of the irradiation pattern 31 that extend approximately orthogonal to the welding direction WD, the speed Vp1 is set equal to a reference speed Vp1_$st$ (Vp1=Vp1_$st$). As the reference speed Vp1_$st$, for example, an average of the speed Vp1 at which the virtual irradiation position P1 moves on the irradiation pattern 31 can be used. For a region AR3 of the irradiation pattern 31 where the virtual irradiation position P1 moves in the direction approximately opposite to the welding direction WD, the speed Vp1 at which the virtual irradiation position P1 moves is set equal to a speed resulting from adding a correction α (α is a positive number) to the reference speed Vp1_$st$. (Vp1=Vp1_$st$+α). On the other hand, for a region AR4 of the irradiation pattern 31 where the virtual irradiation position P1 moves approximately in the welding direction WD, the speed Vp1 at which the virtual irradiation position P1 moves is set equal to a speed resulting from subtracting the correction α from the reference speed Vp1_$st$ (Vp1=Vp1_$st$−α). As described above, controlling the speed Vp1 at which the virtual irradiation position P1 moves on the irradiation pattern 31 allows a speed Vr at which the irradiation position P0 moves on the main body 6 of the joint portion 5 to be maintained within a favorable speed range. That is, the speed Vr at which the irradiation position P0 moves on the main body 6 of the joint portion 5 is made uniform. As a result, an excellent main body 6 of the joint portion 5 having a uniform depth, width, and the like can be obtained.

The hoop supplying device 24 supplies the hoop material 20 unwound while pressing the hoop material 20 against the blank material 2 obliquely from above. The supplying direction SD of the hoop material 20 supplied from the hoop supplying device 24 coincides with the conveying direction CD of the blank material 2, and the supplying speed of the hoop material 20 coincides with the conveying speed of the blank material 2. That is, relative positions of the blank material 2 and the hoop material 20 do not move. Accordingly, the hoop material 20 can be fixed to the blank material 2 by the laser light 26 emitted from the laser oscillation system 25 without being temporarily fixed by a clamp using a fixture or the like. Further, since this eliminates the need for a fixture or the like, the entire surface of the hoop material 20 can be irradiated with the laser light 26. That is, the main body 6 of the joint portion 5 can be formed on the entire surface of the hoop material 20.

After the main body 6 of the joint portion 5 having a necessary length is obtained, the hoop material 20 that is continuous is cut. When the hoop material 20 is cut, the virtual irradiation position P1 is repeatedly moved forward and backward in a direction orthogonal to the welding direction WD without interruption of the conveyance of the blank material 2 and the supply of the hoop material 20. As a result, the irradiation position P0 of the laser light 26 moves forward and backward in a zigzag-line shape at close intervals in a width direction of the hoop material 20 (the direction orthogonal to the welding direction WD), thereby forming the end portion 7 of the joint portion 5. Since the welded portion 4 having a zigzag-line shape is densely located in the end portion 7, a molten pool before solidification reaches the vicinity of the lower surface of the blank material 2. Immediately after the irradiation with the laser light 26 is stopped, the cutting drive device 28 moves the hoop supplying device 24 in the direction indicated by the arrow C (the direction that coincides with the welding direction WD) to apply tension to the hoop material 20. This tension cuts the hoop material 20 at the end portion 7 (see FIG. 7). Of the hoop material 20 thus cut, a portion joined to the blank material 2 along the joint portion 5 becomes the reinforcing material 3.

In order to continuously weld the reinforcing material 3 using the hoop material 20, it is necessary to cut the hoop material 20 every time the joint portion 5 is formed for each sheet of reinforcing material 3. According to the present embodiment, since tension is applied to the hoop material 20 by the cutting drive device 28 to cut the hoop material 20 after the formation of the end portion 7 where the welded portion 4 is densely located, it is not necessary to provide a mechanical cutting device such as a large cutter and in turn makes it possible to downsize the manufacturing apparatus 21. Note that means for applying tension to the hoop material 20 is not particularly limited to any specific means, and means such as a weight or a spring may be employed.

FIG. 8A, FIG. 9A, FIG. 10A, FIG. 11A, FIG. 12A, FIG. 13A, FIG. 14A, FIG. 15A, and FIG. 16A show alternatives of the irradiation patterns 31. FIG. 8B, FIG. 9B, FIG. 10B, FIG. 11B, FIG. 12B, FIG. 13B, FIG. 14B, FIG. 15B, and FIG. 16B each show the main body 6 of the joint portion 5 obtained based on a corresponding one of the irradiation patterns 31. In these drawings, the same or similar elements as shown in FIG. 6A and FIG. 6B are denoted by the same symbols.

For any of these alternative irradiation patterns 31, the control of the speed Vp1 at which the virtual irradiation position P1 moves on the irradiation pattern 31 described with reference to FIG. 6A can be performed. When this control is performed, the speed Vp1 is set equal to the reference speed Vp1_$st$ for a region of the irradiation pattern 31 that extends approximately orthogonal to the welding direction WD. Further, for a region of the irradiation pattern 31 where the virtual irradiation position P1 moves in the direction approximately opposite to the welding direction WD, the speed Vp1 is set equal to a speed resulting from adding the correction α to the reference speed Vp1_$st$ (Vp1=Vp1_$st$+α). Further, for a region of the irradiation pattern 31 where the virtual irradiation position P1 moves approximately in the welding direction WD, the speed Vp1 is set equal to a speed resulting from subtracting the correction α from the reference speed Vp1_st (Vp1=Vp1_st−α).

Figure 8A:
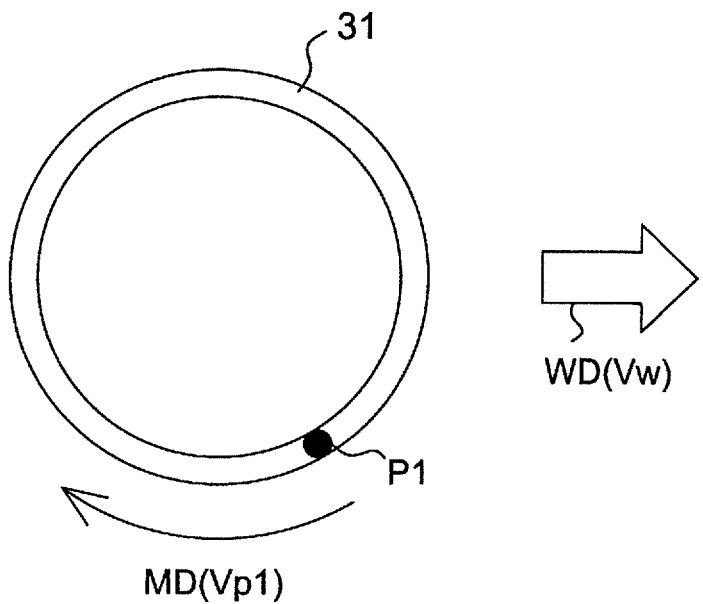
FIG. 8A is a schematic plan view showing a first alternative of the irradiation pattern of laser light.
Figure 8B:
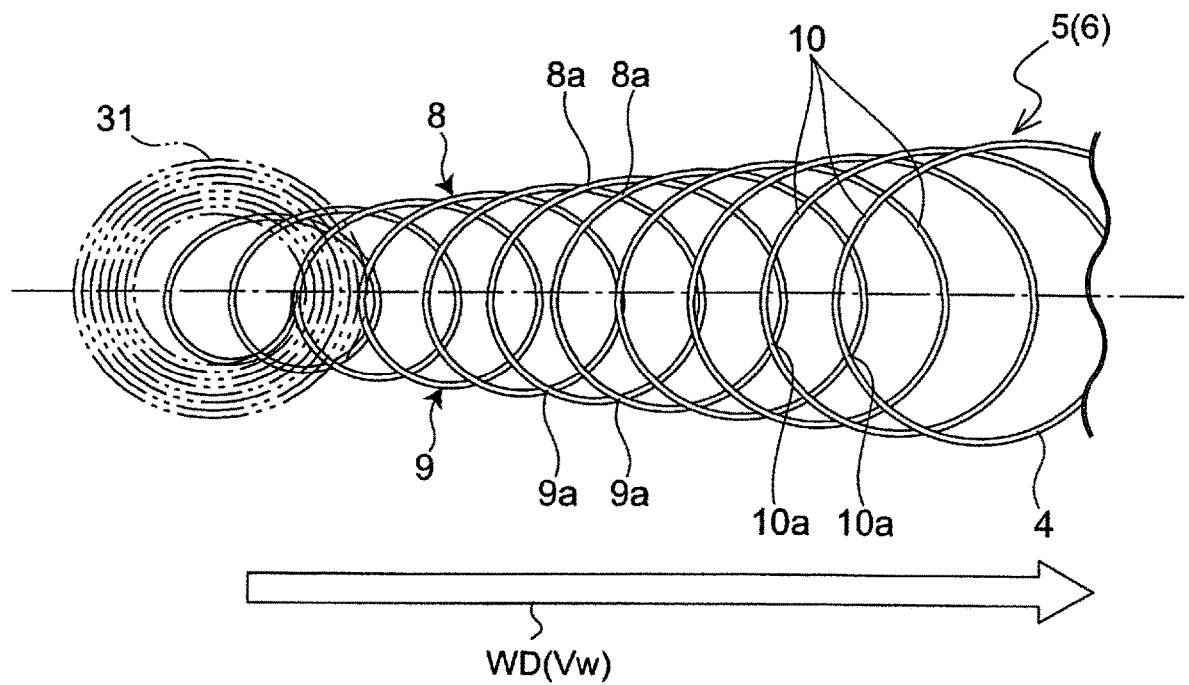
FIG. 8B is a schematic plan view showing an example of a joint portion obtained based on the irradiation pattern shown in FIG. 8A.

The irradiation pattern 31 shown in FIG. 8A has a circular shape, and a radius of the circle gradually increases. As shown in FIG. 8B, in the main body 6 of the joint portion 5 obtained based on this irradiation pattern 31, intersecting portions 10a are formed where the welded portion 4 constituting adjacent connecting portions 10 intersects itself. In other words, in this alternative, a plurality of connecting portions 10 form a network structure. With this irradiation pattern 31, even for the reinforcing material 3 whose width varies in a longitudinal direction, it is possible to form the welded portion 4 by irradiating the entire surface with the laser light 26. In contrast to the case shown in FIG. 8A, the radius of the circular irradiation pattern 31 can be gradually decreased. Further, even with the other irradiation patterns 31 shown in FIG. 9A, FIG. 10A, FIG. 11A, FIG. 12A, FIG. 13A, FIG. 14A, FIG. 15A, and FIG. 16A, a gradual increase or decrease in external dimension allows the entire surface of the reinforcing material 3 whose width varies in the longitudinal direction to be irradiated with the laser light 26.

Figure 9A:
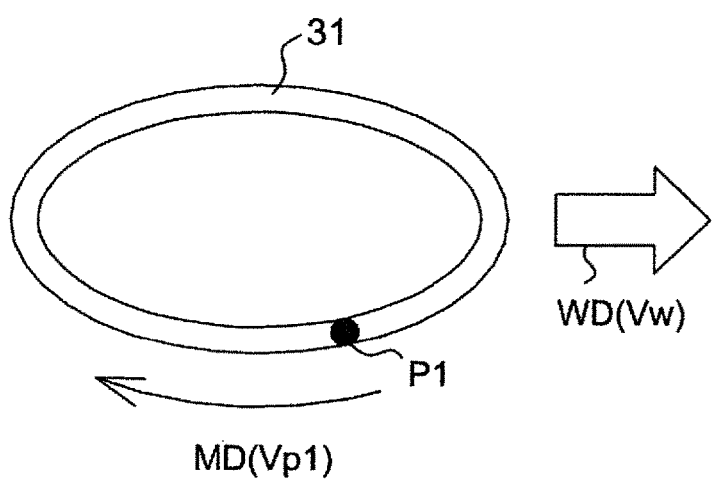
FIG. 9A is a schematic plan view showing a second alternative of the irradiation pattern of laser light.
Figure 9B:
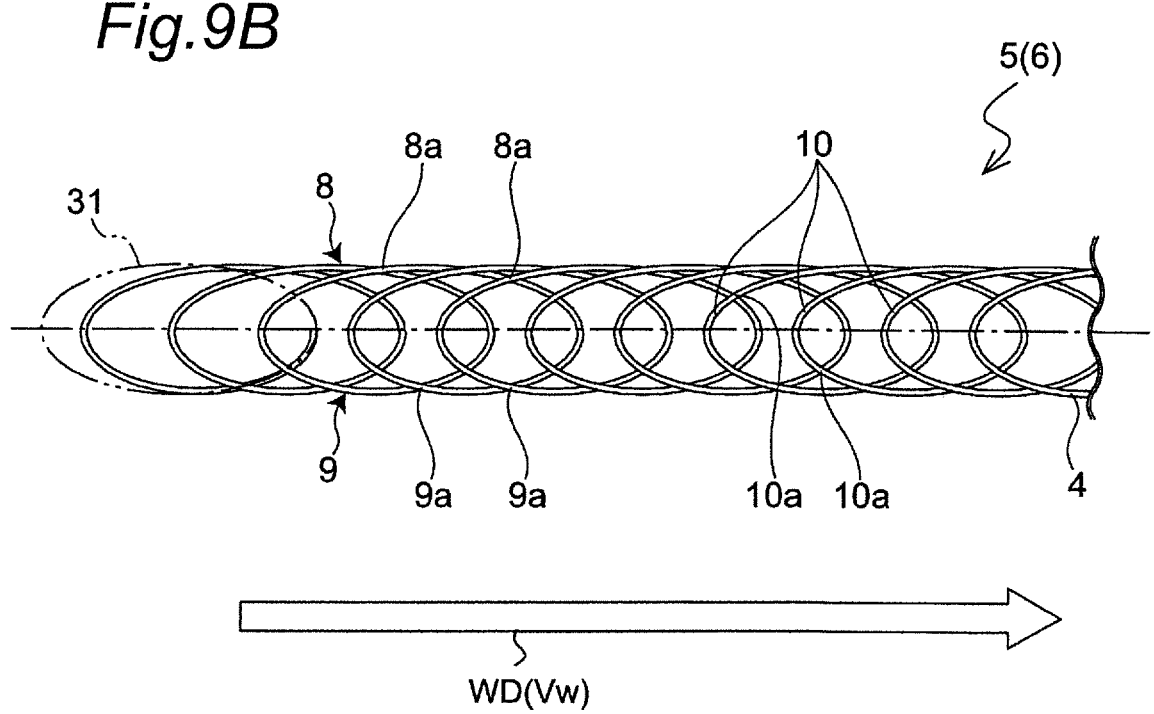
FIG. 9B is a schematic plan view showing an example of a joint portion obtained based on the irradiation pattern shown in FIG. 9A.

The irradiation patterns 31 shown in FIG. 9A has an elliptical shape whose major axis extends in the welding direction WD. As shown in FIG. 9B, in the main body 6 of the joint portion 5 obtained based on this irradiation pattern 31, the intersecting portions 10a are also formed where the welded portion 4 constituting adjacent connecting portions 10 intersects itself. In other words, in this alternative, a plurality of connecting portions 10 form a network structure.

Figure 10A:
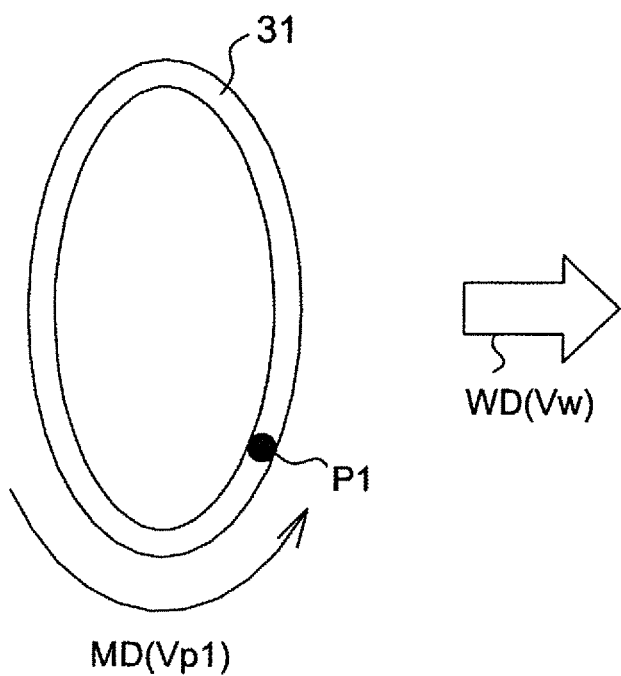
FIG. 10A is a schematic plan view showing a third alternative of the irradiation pattern of laser light.
Figure 10B:
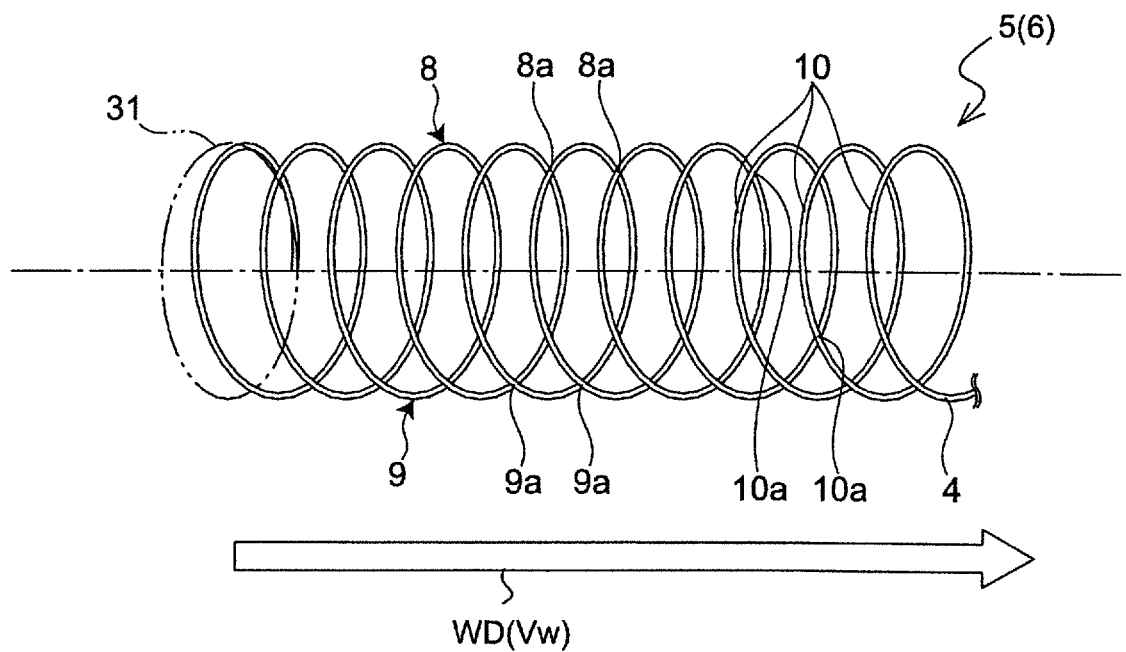
FIG. 10B is a schematic plan view showing an example of a joint portion obtained based on the irradiation pattern shown in FIG. 10A.

The irradiation pattern 31 shown in FIG. 10A has an elliptical shape whose minor axis extends in the welding direction WD. As shown in FIG. 10B, in the main body 6 of the joint portion 5 obtained based on this irradiation pattern 31, the irradiation pattern 31 also has an elliptical shape, but has a plurality of connecting portions 10 arranged in the welding direction WD at intervals closer than the intervals of the irradiation pattern 31 shown in FIG. 9A.

Figure 11A:
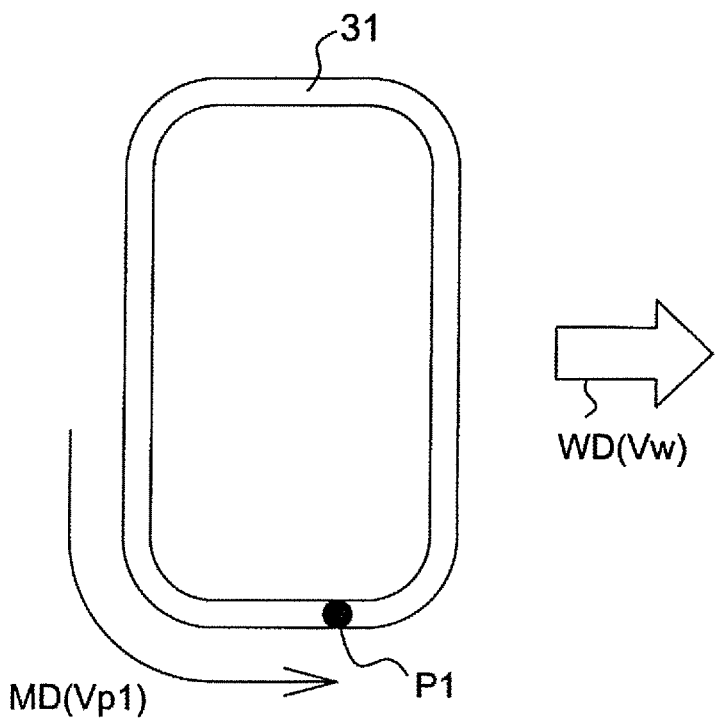
FIG. 11A is a schematic plan view showing a fourth alternative of the irradiation pattern of laser light.
Figure 11B:
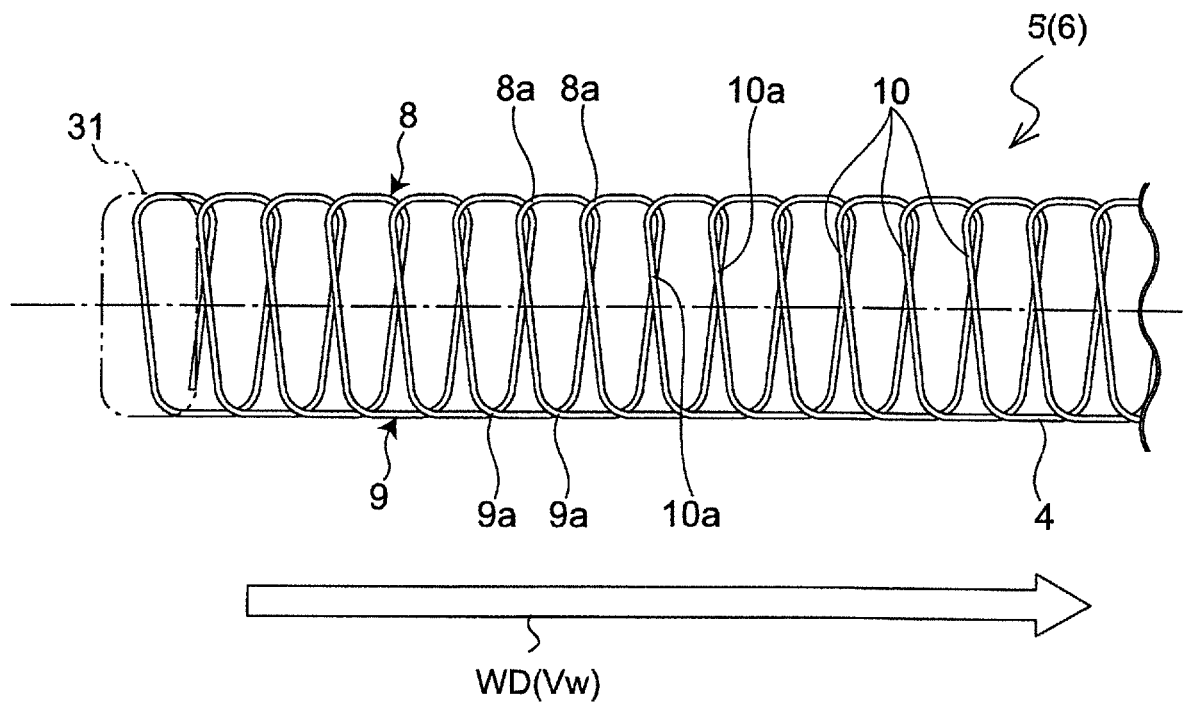
FIG. 11B is a schematic plan view showing an example of a joint portion obtained based on the irradiation pattern shown in FIG. 11A.

The irradiation pattern 31 shown in FIG. 11A has a rectangular shape whose short sides extend in the welding direction WD. As shown in FIG. 11B, in the main body 6 of the joint portion 5 obtained based on this irradiation pattern 31, for example, the first and second longitudinal portions 8, 9 have a shape similar to a geometric straight line as compared with the irradiation pattern 31 (circular) shown in FIG. 6A. Further, each of the connecting portions 10 has a linear shape. Furthermore, the intersecting portions 10a are formed where the welded portion 4 constituting adjacent connecting portions 10 intersects itself. That is, even in this alternative, the plurality of connecting portions 10 form a network structure.

Figure 12A:
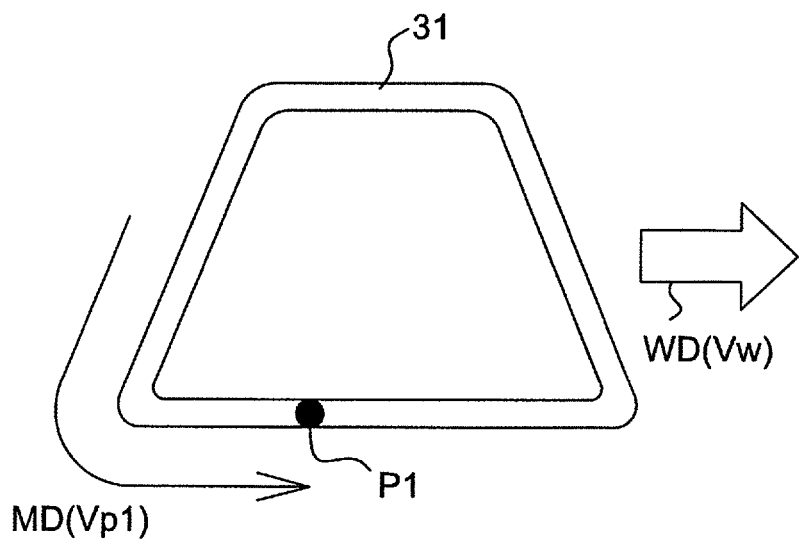
FIG. 12A is a schematic plan view showing a fifth alternative of the irradiation pattern of laser light.

The irradiation pattern 31 shown in FIG. 12A has an isosceles trapezoidal shape whose upper base and lower base extend in the welding direction WD. As shown in FIG. 12B, in this alternative, both the speed Vw at which the laser oscillation system 25 moves in the welding direction WD relative to the blank material 2 and the hoop material 20 and the speed Vp1 at which the virtual irradiation position 91 moves on the irradiation pattern 31 are appropriately set, thereby causing the first and second longitudinal portions 8, 9 to linearly extend in the welding direction WD. This further causes the connecting portions 10 to linearly extend in a direction approximately orthogonal to the welding direction WD. The welded portion 4 constituting the connecting portions 10 does not intersect itself, and the main body 6 of the joint portion 5 forms a ladder structure.

Figure 13B:
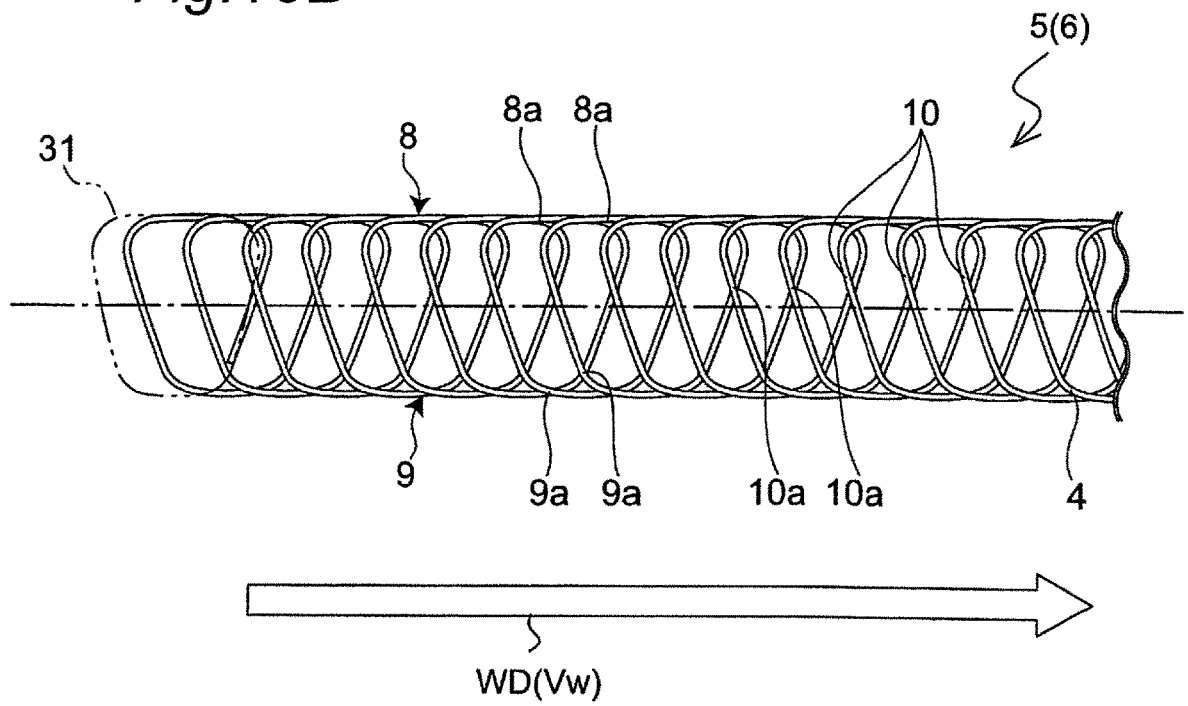
FIG. 13B is a schematic plan view showing an example of a joint portion obtained based on the irradiation pattern shown in FIG. 13A.

The irradiation pattern 31 shown in FIG. 13A has an isosceles trapezoidal shape whose upper base and lower base extend in the welding direction WD, but is a pattern resulting from vertically inverting the irradiation pattern 31 shown in FIG. 12A. As shown in FIG. 13B, in the main body 6 of the joint portion 5 obtained based on this irradiation pattern 31, for example, the first and second longitudinal portions 8, 9 each have a shape similar to a straight line as compared with the irradiation pattern 31 (circular) shown in FIG. 6A. Further, each of the connecting portions 10 has a linear shape. Furthermore, the intersecting portions 10a are formed where the welded portion 4 constituting adjacent connecting portions 10 intersects itself. That is, even in this alternative, the plurality of connecting portions 10 form a network structure.

Figure 14A:
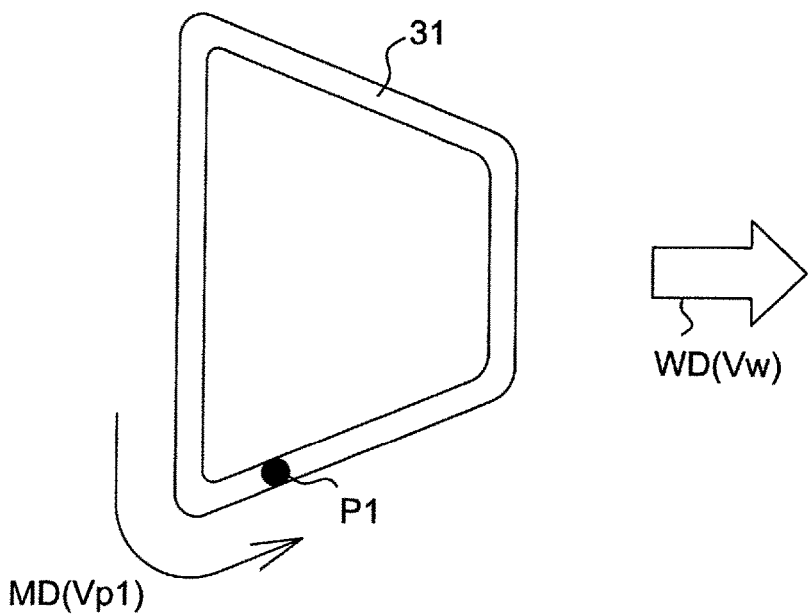
FIG. 14A is a schematic plan view showing a seventh alternative of the irradiation pattern of laser light.
Figure 14B:
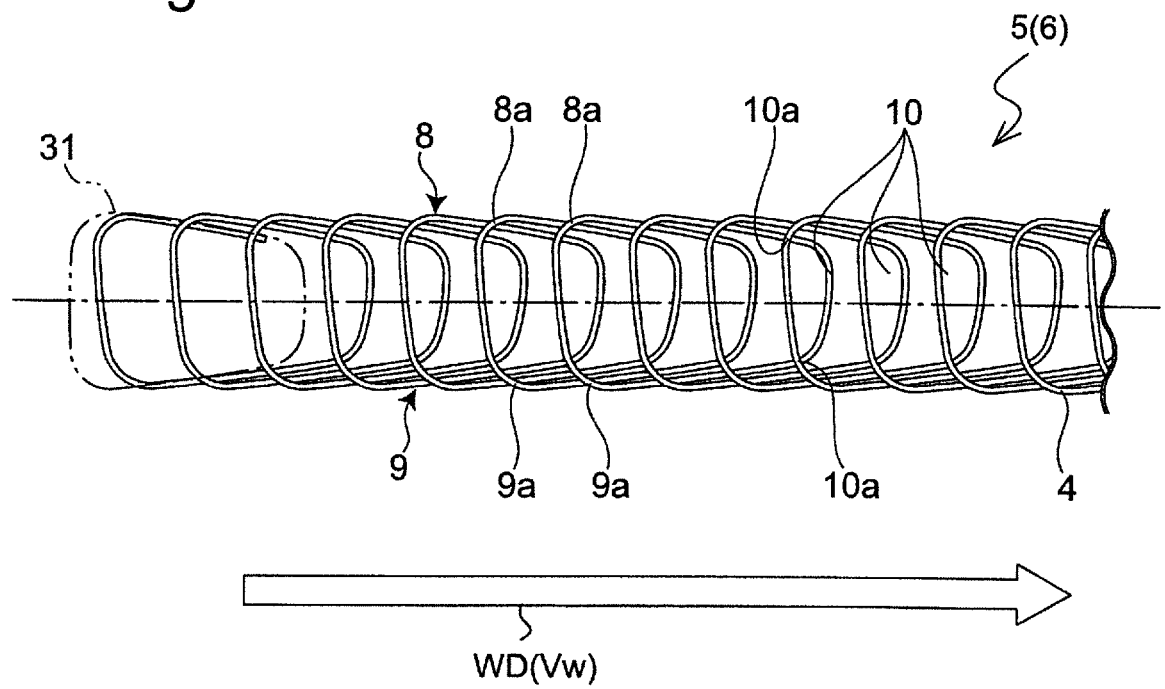
FIG. 14B is a schematic plan view showing an example of a joint portion obtained based on the irradiation pattern shown in FIG. 14A.

The irradiation pattern 31 shown in FIG. 14A has an isosceles trapezoidal shape whose upper base and lower base extend in the direction orthogonal to the welding direction WD, and the upper base is oriented downstream in the welding direction WD. As shown in FIG. 14B, in the main body 6 of the joint portion 5 obtained based on this irradiation pattern 31, each of the connecting portions 10 has an approximately inverted C-shape. Further, the intersecting portions 10a are formed where the welded portion 4 constituting adjacent connecting portions 10 intersects itself. That is, even in this alternative, the plurality of connecting portions 10 form a network structure.

Figure 15A:
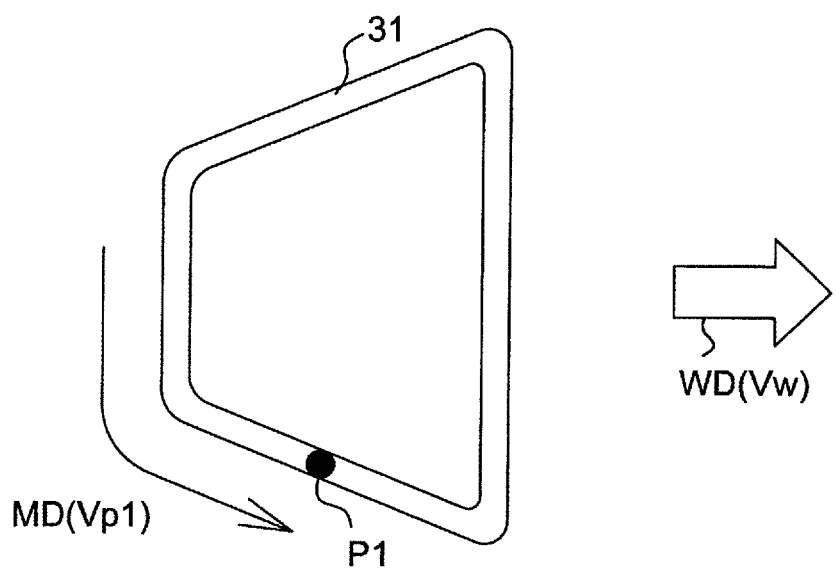
FIG. 15A is a schematic plan view showing an eighth alternative of the irradiation pattern of laser light.
Figure 15B:
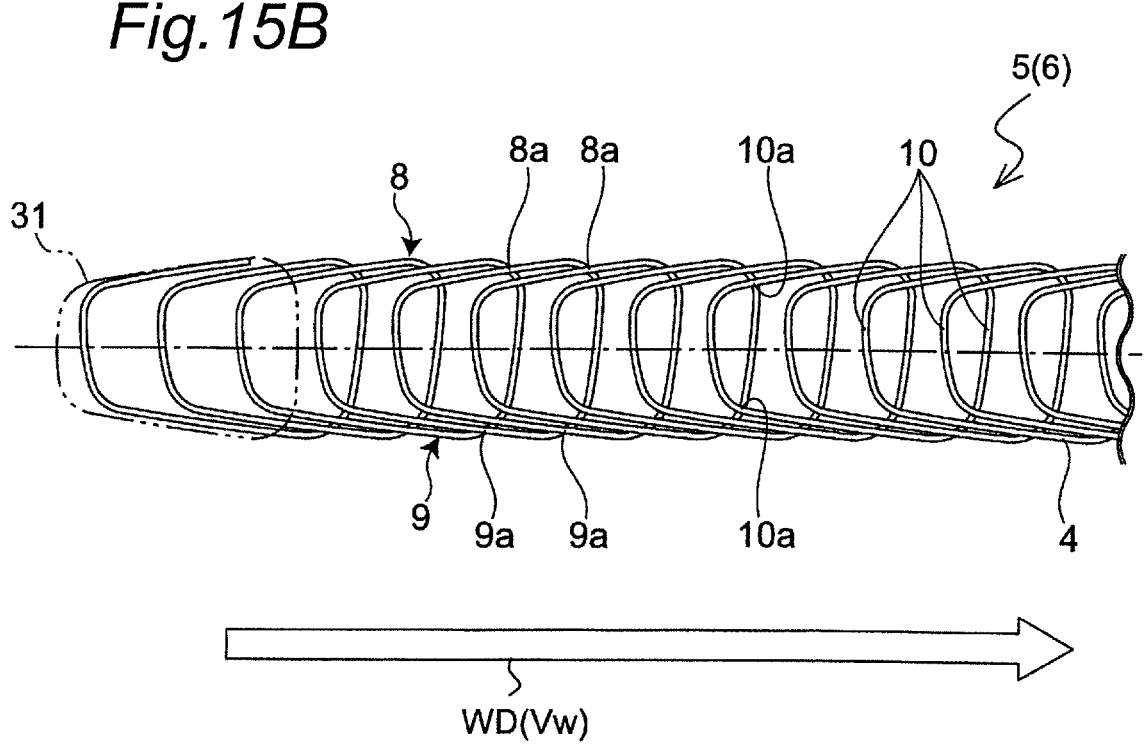
FIG. 15B is a schematic plan view showing an example of a joint portion obtained based on the irradiation pattern shown in FIG. 15A.

The irradiation pattern 31 shown in FIG. 15A has an isosceles trapezoidal shape whose upper base and lower base extend in the direction orthogonal to the welding direction WD, and the lower base is oriented downstream in the welding direction WD. As shown in FIG. 15B, in the main body 6 of the joint portion 5 obtained based on this irradiation pattern 31, each of the connecting portions 10 has an approximately C-shape. Further, the intersecting portions 10a are formed where the welded portion 4 constituting adjacent connecting portions 10 intersects itself. That is, even in this alternative, the plurality of connecting portions 10 form a network structure.

Figure 16A:
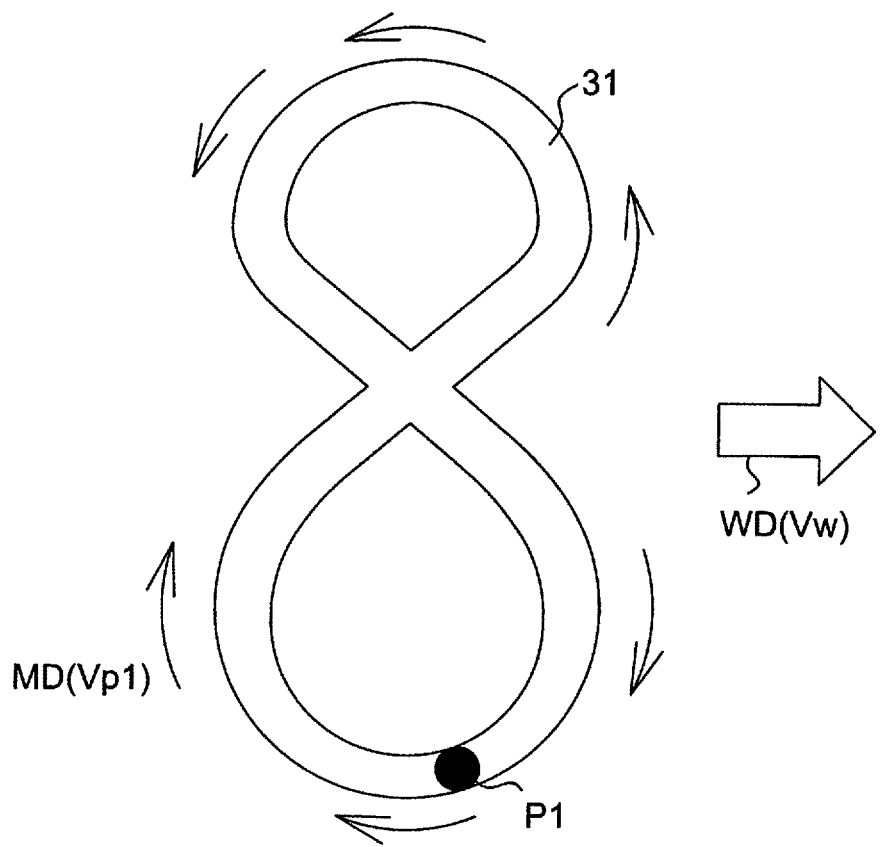
FIG. 16A is a schematic plan view showing a ninth alternative of the irradiation pattern of laser light.
Figure 16B:
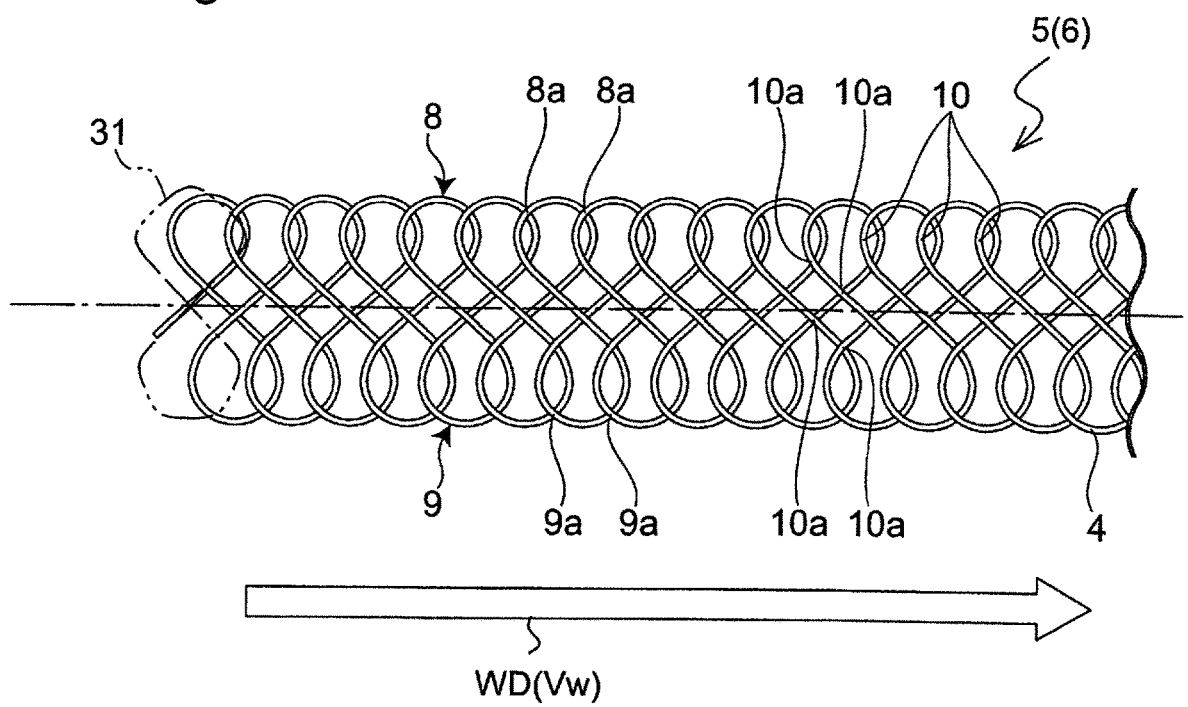
FIG. 16B is a schematic plan view showing an example of a joint portion obtained based on the irradiation pattern shown in FIG. 16A.

The irradiation pattern 31 shown in FIG. 16A has a figure eight shape. As shown in FIG. 16B, in the main body 6 of the joint portion 5 obtained based on this irradiation pattern 31, each of the connecting portions 10 includes curved ends connected to the first and second longitudinal portions 8, 9, and a center portion has an approximately linear shape. Further, the intersecting portions 10a are formed where the welded portion 4 constituting adjacent connecting portions 10 intersects itself. That is, even in this alternative, the plurality of connecting portions 10 form a network structure. An outer circumferential portion of the figure eight shape may have an elliptical shape.

Regarding the manufacturing apparatus 21 according to second and third embodiments to be described below, a structure or function of which no specific description will be given is the same as the structure or function according to the first embodiment. In the drawings relating to these embodiments, the same or similar elements are denoted by the same symbols.

Second Embodiment

Figure 17:
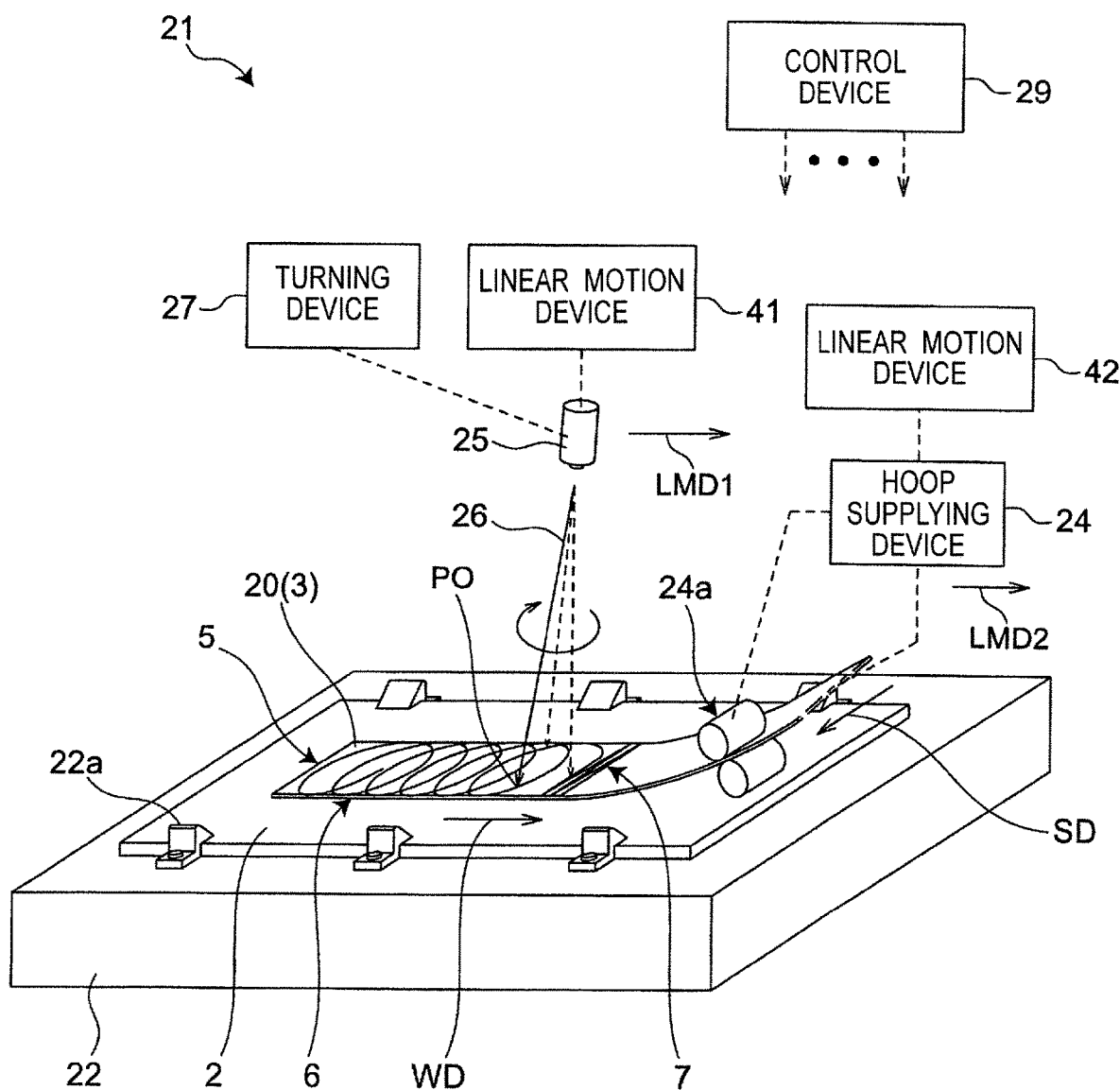
FIG. 17 is a schematic perspective view of a manufacturing apparatus for a joint body according to a second embodiment of the present invention.

FIG. 17 shows a manufacturing apparatus 21 for a joint body according to the second embodiment of the present invention.

The manufacturing apparatus 21 does not include the blank conveying device 23 (see FIG. 1 and FIG. 2), and the table 22 and the blank material 2 held on the table 22 are fixed. The manufacturing apparatus 21 includes a linear motion device 41 that linearly moves the laser oscillation system 25 in the welding direction WD (indicated by an arrow LMD1), and a linear motion device 42 that linearly moves, in a similar manner, the hoop supplying device 24 in the welding direction WD (indicated by an arrow LMD2). The linear motion devices 41, 42 serve as a synchronous motion unit according to the present invention.

The hoop material 20 is continuously supplied by the hoop supplying device 24 from obliquely above the blank material 2. The laser oscillation system 25 and the hoop supplying device 24 move in the welding direction WD at a speed synchronized with the supplying speed of the hoop material 20. Further, the irradiation direction of the laser light 26 emitted from the laser oscillation system 25 is changed by the turning device 27 such that the virtual irradiation position P1 moves along a specific irradiation pattern 31 (see FIG. 6A, FIG. 8A, FIG. 9A, FIG. 10A, FIG. 11A, FIG. 12A, FIG. 13A, FIG. 14A, FIG. 15A, and FIG. 16A). Through the above processes, the joint portion 5 is formed based on the irradiation pattern 31 (see FIG. 6B, FIG. 8B, FIG. 9B, FIG. 10B, FIG. 11B, FIG. 12B, FIG. 13B, FIG. 14B, FIG. 15B, and FIG. 16B). Note that the linear motion device 42 applies, after the formation of the end portion 7 of the joint portion 5, tension to the hoop material 20 to cut the hoop material 20.

Third Embodiment

Figure 18:
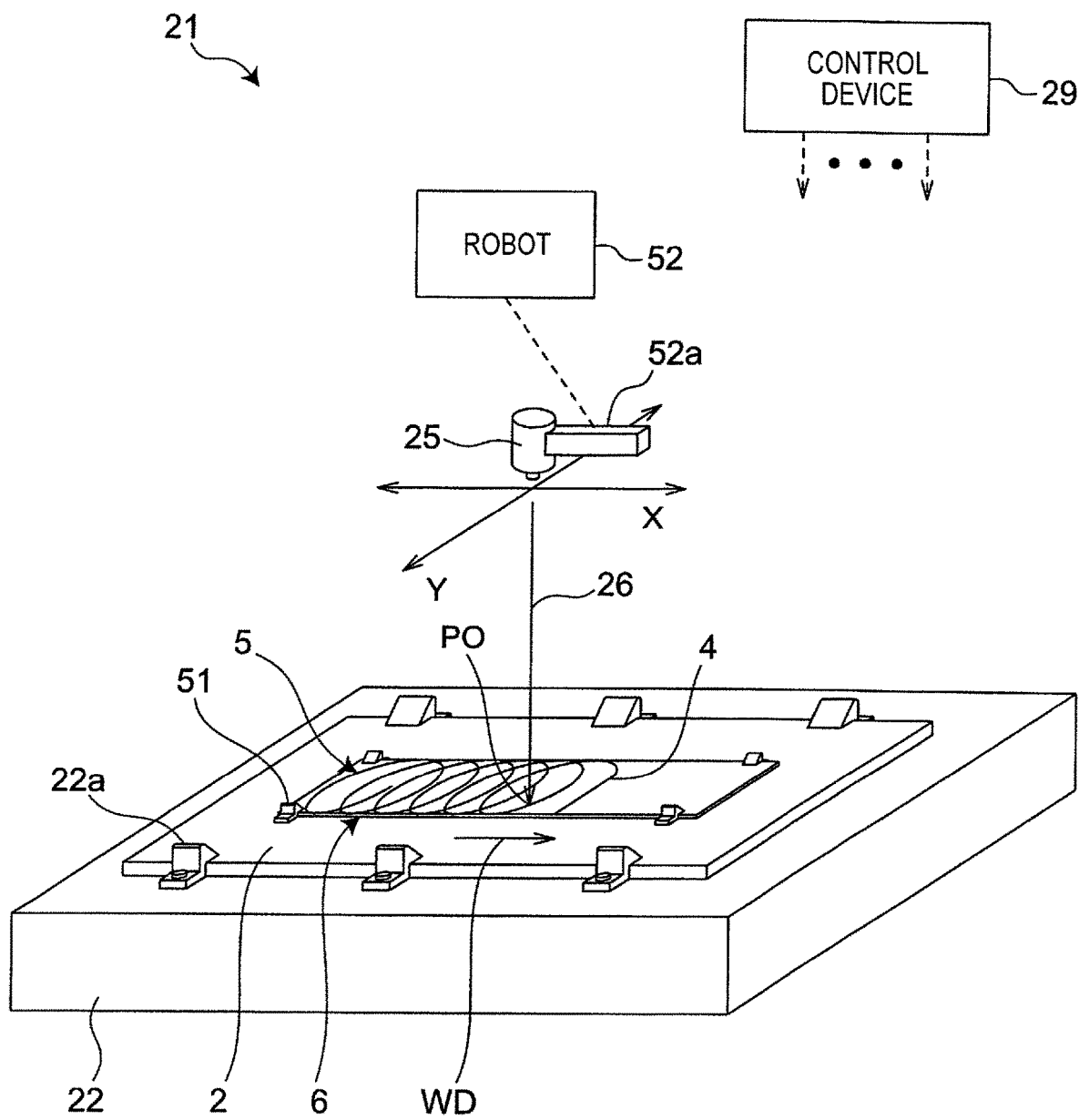
FIG. 18 is a schematic perspective view of a manufacturing apparatus for a joint body according to a third embodiment of the present invention.

FIG. 18 shows a manufacturing apparatus 21 for a joint body according to the third embodiment of the present invention.

The manufacturing apparatus 21 does not include the blank conveying device 23 (see FIG. 1 and FIG. 2), and the table 22 and the blank material 2 held on the table 22 are fixed. Further, the manufacturing apparatus 21 does not include the hoop supplying device 24 (see FIG. 1 and FIG. 2), and the reinforcing material 3 that has been cut out is temporarily fixed to the blank material 2 by a fixture 51. The reinforcing material 3 that has been cut out may be temporarily fixed to the blank material 2 by spot welding or laser spot welding. The laser oscillation system 25 is fixedly held by a robot arm 52a included in a robot 52 such that the laser light 26 is projected downward. In particular, according to the present embodiment, the manufacturing apparatus 21 does not include the turning device 27 (see FIG. 1 and FIG. 2), and the irradiation direction of the laser light 26 is constant.

The robot arm 52a moves the laser oscillation system 25 in two directions in a horizontal plane, that is, in an X direction and Y direction, such that the irradiation position P0 moves along a desired main body 6 of the joint portion 5 (see FIG. 6B, FIG. 8B, FIG. 9B, FIG. 10B, FIG. 11B, FIG. 12B, FIG. 13B, FIG. 14B, FIG. 15B, and FIG. 16B).

Figure 19:
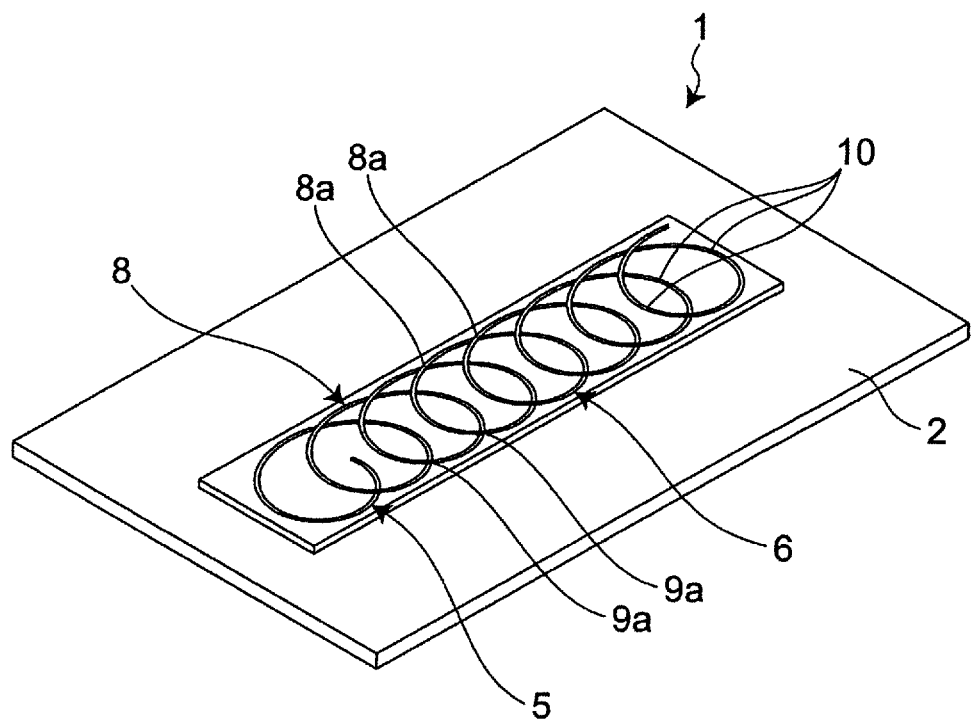
FIG. 19 is a perspective view of an example of the joint body manufactured by the manufacturing apparatus according to the third embodiment of the present invention.

FIG. 19 shows the joint body 1 manufactured by the manufacturing apparatus 21 according to the present embodiment. Since the reinforcing material 3 that has been cut out is used rather than applying tension to the hoop material 20 to cut the hoop material 20, the joint portion 5 of the joint body 1 includes only the main body 6 without the end portion 7. Similarly, even when the joint body 1 is manufactured by the manufacturing apparatus 21 according to the first embodiment (FIG. 4 and FIG. 5) and the manufacturing apparatus according to the second embodiment (FIG. 17), a configuration where the reinforcing material 3 that has been cut out rather than the hoop material 20 that is continuously supplied is joined to the blank material 2 allows the joint portion 5 to include only the main body 6 without the end portion 7.

Figure 20:
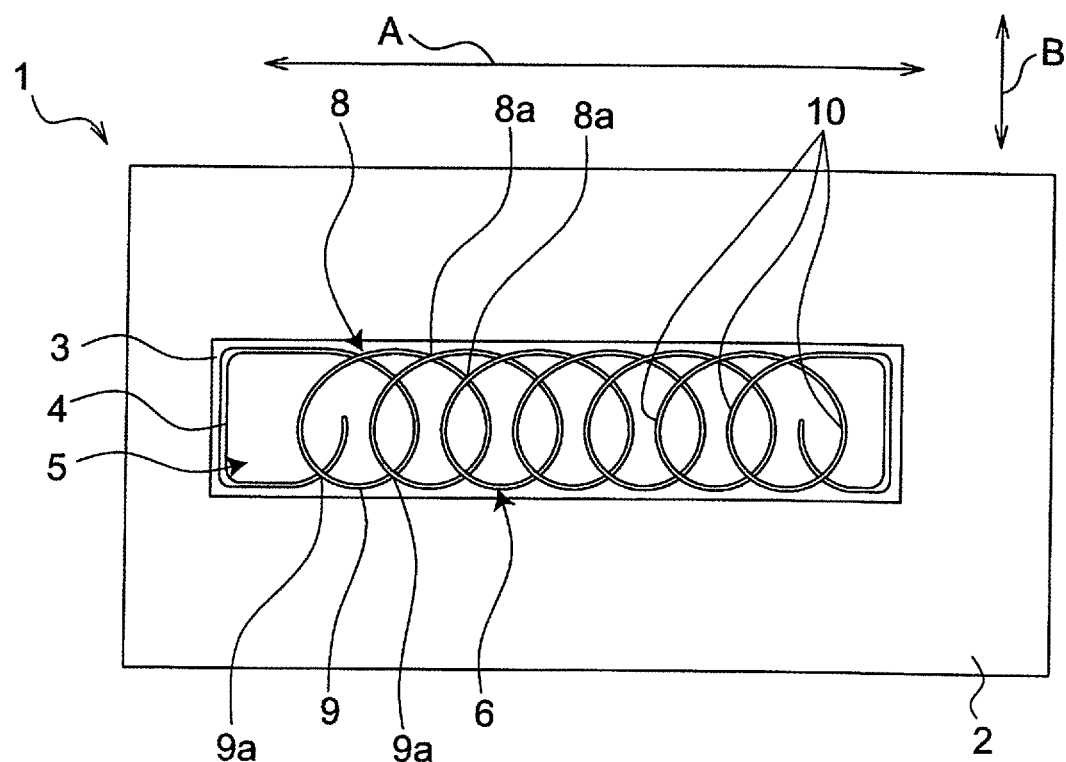
FIG. 20 is a plan view showing an alternative of the joint body.

FIG. 20 shows an alternative of the joint body 1. In this alternative, the joint portion 5 is formed, based on the irradiation pattern 31 shown in FIG. 12A, at both ends of the reinforcing material 3, and the joint portion 5 is formed, based on the irradiation pattern 31 shown in FIG. 9A, at portions other than both the ends of the reinforcing material 3. This causes the joint portion 5 to have, at both the ends of the reinforcing material 3, the same shape as shown in FIG. 12B and to have, at the portions other than both the ends of the reinforcing material 3, the same shape as shown in FIG. 9B. The irradiation pattern 31 shown in FIG. 12A is applied to both the ends of the reinforcing material 3 to provide the welded portion 4 at the corners of the reinforcing material 3, thereby further increasing the joint strength of the reinforcing material 3 to the blank material 2. At least any two of the irradiation patterns 31 shown in FIG. 6A, FIG. 8A, FIG. 9A, FIG. 10A, FIG. 11A, FIG. 12A, FIG. 13A, FIG. 14A, FIG. 15A, and FIG. 16A may be used in combination.

The invention claimed is:

1. A manufacturing method for a joint body having a first metal member and a second metal member joined together by causing a laser oscillation system to irradiate a surface of the second metal member placed on the first metal member with laser light to form a joint portion including a welded portion where the first metal member and the second metal member are joined together, the manufacturing method comprising:
   placing the first metal member on a support table having a fixture in such a manner that the first metal member is fixed onto the support table by engagement between the first metal member and the fixture;
   continuously supplying the second metal member while pressing the second metal member against the first metal member, the second metal member being a hoop material; and
   causing the laser oscillation system to emit the laser light; wherein
   an irradiation position of the laser light is moved to cause the joint portion to include
   a first longitudinal portion extending in a first direction, the first longitudinal portion having first intersecting portions arranged in the first direction, the welded portion intersecting itself at the first intersecting portions,
   a second longitudinal portion located apart from the first longitudinal portion in a second direction intersecting the first direction and extending in the first direction, the second longitudinal portion having second intersecting portions arranged in the first direction, the welded portion intersecting itself at the second intersecting portions,
   a plurality of connecting portions arranged in the first direction, each extending in the second direction and connecting the first longitudinal portion and the second longitudinal portion,
   assuming that the laser oscillation system is not in motion in a welding direction relative to the first and second metal members, an irradiation direction of the laser light is periodically changed, and the laser oscillation system is moved in the welding direction relative to the first and second metal members to move the irradiation position along a closed figure, a position of the first metal member is fixed, the second metal member, a source of supply of the second metal member, and the laser oscillation system are moved in the welding direction at a speed synchronized with a supplying speed of the second metal member, and the irradiation direction of the laser light emitted from the laser oscillation system is periodically changed to move the irradiation position along the closed figure.

2. The manufacturing method for a joint body according to claim 1, wherein the first metal member is conveyed in a conveying direction opposite to the welding direction, and the second metal member is continuously supplied in a supplying direction that coincides with the conveying direction, and with a position of the laser oscillation system fixed, the irradiation direction of the laser light emitted from the laser oscillation system is periodically changed to move the irradiation position along the closed figure.

3. A manufacturing apparatus for a joint body having a first metal member and a second metal member joined together by causing a laser oscillation system to irradiate a surface of the second metal member placed on the first metal member with laser light to form a joint portion including a welded portion where the first metal member and the second metal member are joined together, the manufacturing apparatus comprising:

a support table having a fixture, wherein the first metal member is fixed on the support table by engagement between the first metal member and the fixture; and a supplying unit configured to continuously supply the second metal member while pressing the second metal member against the first metal member, the second metal member being a hoop material, an irradiation position motion unit configured to move an irradiation position of the laser light to cause the joint portion to include a first longitudinal portion extending in a first direction, the first longitudinal portion having first intersecting portions arranged in the first direction, the welded portion intersecting itself at the first intersecting portions, a second longitudinal portion located apart from the first longitudinal portion in a second direction intersecting the first direction and extending in the first direction, the second longitudinal portion having second intersecting portions arranged in the first direction, the welded portion intersecting itself at the second intersecting portions, and a plurality of connecting portions arranged in the first direction, each extending in the second direction and connecting the first longitudinal portion and the second longitudinal portion, wherein assuming that the laser oscillation system is not in motion in a welding direction relative to the first and second metal members, the irradiation position motion unit periodically changes an irradiation direction of the laser light and moves the laser oscillation system in the welding direction relative to the first and second metal members to move the irradiation position along a closed figure, wherein a position of the first metal member is fixed, and the irradiation position motion unit includes the supplying unit, a synchronous motion unit configured to move the supplying unit and the laser oscillation system in the welding direction at a speed synchronized with a supplying speed of the second metal member, and an irradiation direction changing unit configured to periodically change the irradiation direction of the laser light emitted from the laser oscillation system to move the irradiation position along the closed figure.

4. The manufacturing apparatus for a joint body according to claim 3, wherein a position of the laser oscillation system is fixed, and the irradiation position motion unit includes a conveying unit configured to convey the first metal member in a conveying direction opposite to the welding direction, wherein the supplying unit continuously supplies the second metal member in a supplying direction that coincides with the conveying direction.

5. A manufacturing apparatus for a joint body having a first metal member and a second metal member joined together by causing a laser oscillation system to irradiate a surface of the second metal member placed on the first metal member with laser light to form a joint portion including a welded portion where the first metal member and the second metal member are joined together, the manufacturing apparatus comprising:

a supplying unit configured to continuously supply the second metal member while pressing the second metal member against the first metal member, the second metal member being a hoop material, an irradiation position motion unit configured to move an irradiation position of the laser light to cause the joint portion to include a first longitudinal portion extending in a first direction, the first longitudinal portion having first intersecting portions arranged in the first direction, the welded portion intersecting itself at the first intersecting portions, a second longitudinal portion located apart from the first longitudinal portion in a second direction intersecting the first direction and extending in the first direction, the second longitudinal portion having second intersecting portions arranged in the first direction, the welded portion intersecting itself at the second intersecting portions, and a plurality of connecting portions arranged in the first direction, each extending in the second direction and connecting the first longitudinal portion and the second longitudinal portion, wherein assuming that the laser oscillation system is not in motion in a welding direction relative to the first and second metal members, the irradiation position motion unit periodically changes an irradiation direction of the laser light and moves the laser oscillation system in the welding direction relative to the first and second metal members to move the irradiation position along a closed figure, wherein a position of the first metal member is fixed, and the irradiation position motion unit includes the supplying unit, a synchronous motion unit configured to move the supplying unit and the laser oscillation system in the welding direction at a speed synchronized with a supplying speed of the second metal member, and an irradiation direction changing unit configured to periodically change the irradiation direction of the laser light emitted from the laser oscillation system to move the irradiation position along the closed figure.

6. A manufacturing method for a joint body having a first metal member and a second metal member joined together by causing a laser oscillation system to irradiate a surface of the second metal member placed on the first metal member with laser light to form a joint portion including a welded portion where the first metal member and the second metal member are joined together, the manufacturing method comprising:

continuously supplying the second metal member while pressing the second metal member against the first metal member, the second metal member being a hoop material; and causing the laser oscillation system to emit the laser light; wherein an irradiation position of the laser light is moved to cause the joint portion to include a first longitudinal portion extending in a first direction, the first longitudinal portion having first intersecting portions arranged in the first direction, the welded portion intersecting itself at the first intersecting portions, a second longitudinal portion located apart from the first longitudinal portion in a second direction intersecting the first direction and extending in the first direction, the second longitudinal portion having second intersecting portions arranged in the first direction, the welded portion intersecting itself at the second intersecting portions, a plurality of connecting portions arranged in the first direction, each extending in the second direction and connecting the first longitudinal portion and the second longitudinal portion, assuming that the laser oscillation system is not in motion in a welding direction relative to the first and second metal members, an irradiation direction of the laser light is periodically changed, and the laser oscillation system is moved in the welding direction relative to the first and second metal members to move the irradiation position along a closed figure, a position of the first metal member is fixed, the second metal member, a source of supply of the second metal member, and the laser oscillation system are moved in the welding direction at a speed synchronized with a supplying speed of the second metal member, and the irradiation direction of the laser light emitted from the laser oscillation system is periodically changed to move the irradiation position along the closed figure.

* * * * *